(12) United States Patent
Masuda et al.

(10) Patent No.: US 12,103,115 B2
(45) Date of Patent: Oct. 1, 2024

(54) BRAZING MATERIAL, BRAZING MEMBER, HEAT EXCHANGER, AND PRODUCING METHOD OF BRAZING MEMBER

(71) Applicant: Harima Chemicals, Incorporated, Kakogawa (JP)

(72) Inventors: Wataru Masuda, Hyogo (JP); Daigo Kiga, Hyogo (JP); Aoi Tazuru, Hyogo (JP); Satoshi Moriya, Hyogo (JP)

(73) Assignee: Harima Chemicals, Incorporated, Kakogawa (JP)

( * ) Notice: Subject to any disclaimer, the term of this patent is extended or adjusted under 35 U.S.C. 154(b) by 736 days.

(21) Appl. No.: 17/268,683

(22) PCT Filed: Aug. 20, 2019

(86) PCT No.: PCT/JP2019/032416
§ 371 (c)(1),
(2) Date: Feb. 16, 2021

(87) PCT Pub. No.: WO2020/040128
PCT Pub. Date: Feb. 27, 2020

(65) Prior Publication Data
US 2021/0187672 A1   Jun. 24, 2021

(30) Foreign Application Priority Data

Aug. 21, 2018 (WO) ............... PCT/JP2018/030806

(51) Int. Cl.
*B23K 35/28* (2006.01)
*B23K 35/02* (2006.01)
(Continued)

(52) U.S. Cl.
CPC ........ *B23K 35/286* (2013.01); *B23K 35/0244* (2013.01); *B23K 35/36* (2013.01);
(Continued)

(58) Field of Classification Search
CPC .............. B23K 35/286; B23K 35/0244; B23K 35/362; B23K 2103/10; B23K 35/36;
(Continued)

(56) References Cited

U.S. PATENT DOCUMENTS 5,781,846 A   7/1998 Jossick
6,342,106 B1  1/2002 Koch et al.
(Continued)

FOREIGN PATENT DOCUMENTS

CN   101412168 B    12/2010
CN   104607826 A *  5/2015   ........... B23K 35/362
(Continued)

OTHER PUBLICATIONS

CN-104607826-A: Espacenet English machine translation (Year: 2015).*

(Continued)

*Primary Examiner* — Adil A. Siddiqui
(74) *Attorney, Agent, or Firm* — BUCHANAN, INGERSOLL & ROONEY PC

(57) ABSTRACT

A brazing material for brazing aluminum or an aluminum alloy includes fluoride-based flux, a solidifying agent, and an organic viscosity reducing agent and is solid at 25° C.

27 Claims, 3 Drawing Sheets

(51) Int. Cl.
  *B23K 35/36*  (2006.01)
  *B23K 35/362*  (2006.01)
  *B23K 103/10*  (2006.01)
  *C22C 21/00*  (2006.01)
  *C22C 21/02*  (2006.01)

(52) U.S. Cl.
  CPC ...... *B23K 35/3601* (2013.01); *B23K 35/3613* (2013.01); *B23K 35/3616* (2013.01); *B23K 35/362* (2013.01); *C22C 21/00* (2013.01); *C22C 21/02* (2013.01); *B23K 2103/10* (2018.08)

(58) Field of Classification Search
  CPC ............ B23K 35/3601; B23K 35/3613; B23K 35/3616; C22C 21/02; C22C 21/00
  See application file for complete search history.

(56) References Cited

U.S. PATENT DOCUMENTS

| | | | |
|---|---|---|---|
| 6,758,389 B1* | 7/2004 | Odaka ................. | H05K 3/3452 228/223 |
| 2007/0187462 A1* | 8/2007 | Wittebrood ........ | B23K 35/3613 228/101 |
| 2008/0135134 A1 | 6/2008 | Kim | |
| 2015/0239071 A1* | 8/2015 | Kiga ..................... | F28F 21/084 148/24 |

FOREIGN PATENT DOCUMENTS

| | | | |
|---|---|---|---|
| CN | 104607826 B | 2/2017 | |
| JP | S54041251 A | 4/1979 | |
| JP | H03501578 A | 4/1991 | |
| JP | H03155460 A | 7/1991 | |
| JP | H04018793 A | 1/1992 | |
| JP | H06213532 A | 8/1994 | |
| JP | H09314380 A | 12/1997 | |
| JP | H10300382 A | 11/1998 | |
| JP | 2000061624 A | 2/2000 | |
| JP | 2000121286 A | 4/2000 | |
| JP | 2605035 Y2 | 6/2000 | |
| JP | 2001520940 A | 11/2001 | |
| JP | 2002243378 A | 8/2002 | |
| JP | 2004074267 A | 3/2004 | |
| JP | 2006-255755 A | 9/2006 | |
| JP | 4736105 B1 * | 7/2011 | |
| JP | 2017006933 A | 1/2017 | |
| JP | 2017226900 A | 12/2017 | |
| JP | 2018508348 A | 3/2018 | |
| JP | 2018074060 A | 5/2018 | |
| WO | 8905278 A1 | 6/1989 | |
| WO | 2016073566 A1 | 5/2016 | |
| WO | 2018235906 A1 | 12/2018 | |

OTHER PUBLICATIONS

Kawasaki et al., "Development of hardness homogeneity and superplastic behavior in an aluminum-copper eutectic alloy processed by high-pressure torsion"; Jan. 20, 2013; Materials Science & Engineering A 561 (2013); pp. 118-125 (Year: 2013).*
JP 4736105 B1: Espacenet English machine translation cited and attached (Year: 2011).*
Notification Concerning Transmittal of International Preliminary Report on Patentability (Chapter I of the Patent Cooperation Treaty) (PCT Rule 44bis.I(c)) (Forms PCT/IB/326 and PCT/ISA/373) issued on Feb. 23, 2021, by the International Bureau of WIPO in corresponding to International Application No. PCT/JP2019/032416. (5 pages).
Notification of Transmittal of Translation of the International Preliminary Report on Patentability (Chapter I or Chapter II (PCT Rules 44bis.3(c) and 72.2) (Forms PCT/IB/338 and PCT/IB/373) issued on Feb. 23, 2021, by the International Bureau of WIPO in corresponding International Application No. PCT/JP2019/032416. (5 pages).
The Extended European Search Report issued on May 6, 2022, by the European Patent Office in corresponding European Patent Application No. 19851142.0. (7 pages).
Office Action (Notice of Reasons for Refusal) issued Apr. 4, 2023, by the Japan Patent Office in corresponding Japanese Patent Application No. 2020-538400 and an English translation of the Office Action. (13 pages).
International Search Report (PCT/ISA/210) issued on Nov. 19, 2019, by the Japanese Patent Office as the International Searching Authority for International Application No. PCT/JP2019/032416, and an English translation of the Report.
Written Opinion (PCT/ISA/237) issued on Nov. 19, 2019, by the Japanese Patent Office as the International Searching Authority for International Application No. PCT/JP2019/032416.

* cited by examiner

BRAZING MATERIAL, BRAZING MEMBER, HEAT EXCHANGER, AND PRODUCING METHOD OF BRAZING MEMBER

TECHNICAL FIELD

The present invention relates to a brazing material, a brazing member, a heat exchanger, and a method for producing a brazing member, to be specific, to a brazing material for brazing aluminum or an aluminum alloy, a brazing member including a coating film formed by applying the brazing material, a heat exchanger including the brazing member, and furthermore, a method for producing a brazing member for producing the brazing member.

BACKGROUND ART

Conventionally, flux is used to remove oxides of metal members that are welded when the metal members are welded.

Since the flux is usually liquid, the flux may flow when applied to a welding site. When the flux is liquid, a dry facility for a solvent is required to solidify a coating film, which may cause complication of the production line, and furthermore, the workability may be inferior due to scattering of the liquid flux and the like.

Therefore, in order to achieve simplification of the production line and improve the workability, it has been considered to use solid flux, and a brazing composition formed by uniformly blending a brazing material powder, a fluoride-based flux powder, and a solid wax at normal temperature has been, for example, proposed. It has also been proposed to form a coating layer for brazing by melting the blazing composition and applying it to the surface of an aluminum material (ref: for example, Patent Document 1 below).

For example, it has been proposed that, after mixing a metal powder for brazing, a paraffin wax, and flux for brazing, the resulting mixture is water-dispersed to be used as a composition for brazing (ref: for example, Patent Document 2 below).

CITATION LIST

Patent Document

Patent Document 1: Japanese Unexamined Patent Publication No. H9-314380
Patent Document 2: Japanese Unexamined Patent Publication No. H3-155460

SUMMARY OF THE INVENTION

Problem to be Solved by the Invention

On the other hand, when the above-described solid brazing composition at normal temperature is melted and liquefied to be applied to an object to be coated, there is a problem that the dispersibility of a fluoride-based flux powder is not sufficient and the brazing properties are inferior. In addition, there is a problem that the application properties (liquid application properties) are not sufficient when the brazing composition is liquefied to be applied to the objected to be coated.

Further, it is also considered that the brazing composition is applied to an object to be coated by bringing the above-described solid brazing composition at normal temperature into contact with the object to be coated in a solid state and rubbing it if necessary. In this case, from the viewpoint of application properties, it is required to form the brazing composition into a desired shape. However, since the above-described brazing composition does not have sufficient moldability, it is difficult to form it into a desired shape, and as a result, it is inferior in application properties in a solid state (solid application properties).

The present invention provides a brazing material which has excellent brazing properties and excellent application properties (liquid application properties and solid application properties), while achieving simplification of the production line and improving workability, a brazing member including a coating film formed by applying the brazing material, a heat exchanger including the brazing member, and furthermore, a method for producing a brazing member.

Means for Solving the Problem

The present invention [1] includes a brazing material for brazing aluminum or an aluminum alloy including fluoride-based flux, a solidifying agent, and an organic viscosity reducing agent and being solid at 25° C.

The present invention [2] includes the brazing material described in the above-described [1] being softened by heating and having the viscosity at 150° C. of 100 Pa s or less.

The present invention [3] includes the brazing material described in the above-described [1] or [2], wherein a mixing ratio of the organic viscosity reducing agent with respect to the total amount of the brazing material is 0.10% by mass or more and 55% by mass or less.

The present invention [4] includes the brazing material described in any one of claims [1] to [3], wherein the organic viscosity reducing agent includes a surfactant and/or an organic solvent in liquid at 10° C.

The present invention [5] includes the brazing material described in claim [4], wherein the surfactant includes at least one selected from the group consisting of a nonionic surfactant, an anionic surfactant, a cationic surfactant, and an amphoteric surfactant.

The present invention [6] includes the brazing material described in the above-described [4] or [5], wherein the surfactant includes a nonionic surfactant, and the number of carbon atoms of a hydrophobic group of the nonionic surfactant is 10 or more.

The present invention [7] includes the brazing material described in any one of the above-described [4] to [6], wherein the surfactant includes a nonionic surfactant, and an HLB value of the nonionic surfactant is 17.5 or less.

The present invention [8] includes the brazing material described in any one of the above-described [4] to [7], wherein the surfactant includes a nonionic surfactant, and the nonionic surfactant includes a polyoxyalkylene group.

The present invention [9] includes the brazing material described in the above-described [4] or [5], wherein the surfactant includes an anionic surfactant, and the number of carbon atoms of a hydrophobic group of the anionic surfactant is 20 or less.

The present invention [10] includes the brazing material described in any one of the above-described [4], [5] and [9], wherein the surfactant includes an anionic surfactant, and the anionic surfactant includes at least one selected from the group consisting of a carboxylic acid group, a carboxylic acid salt, a sulfonic acid group, and a sulfonic acid salt.

The present invention [11] includes the brazing material described in the above-described [4] or [5], wherein the surfactant includes a cationic surfactant, and the number of carbon atoms of a hydrophobic group of the cationic surfactant is 20 or less.

The present invention [12] includes the brazing material described in any one of the above-described [4], [5], and [11], wherein the surfactant includes a cationic surfactant, and the cationic surfactant includes an amino group and/or a salt thereof.

The present invention [13] includes the brazing material described in the above-described [4] or [5], wherein the surfactant includes an amphoteric surfactant, and the number of carbon atoms of a hydrophobic group of the amphoteric surfactant is 20 or less.

The present invention [14] includes the brazing material described in any one of the above-described [4], [5] and [13], wherein the surfactant includes an amphoteric surfactant, and the amphoteric surfactant includes an amino group and/or a salt thereof.

The present invention [15] includes the brazing material described in the above-described [4] or [5], wherein the surfactant includes a nonionic surfactant and an anionic surfactant.

The present invention [16] includes the brazing material described in the above-described [4] or [5], wherein the surfactant includes a nonionic surfactant and a cationic surfactant.

The present invention [17] includes the brazing material described in the above-described [4] or [5], wherein the surfactant includes a nonionic surfactant and an amphoteric surfactant.

The present invention [18] includes the brazing material described in any one of the above-described [4] to [17], wherein a mixing ratio of the surfactant with respect to the total amount of the brazing material is 0.2% by mass or more and 50% by mass or less.

The present invention [19] includes the brazing material described in the above-described [4], wherein the organic solvent includes at least one selected from the group consisting of hydrocarbons, halogenated hydrocarbons, alcohols, esters, ethers, and oils and fats.

The present invention [20] includes the brazing material described in the above-described [4] or [19], wherein a mixing ratio of the organic solvent with respect to the total amount of the brazing material is 55% by mass or less.

The present invention [21] includes the brazing material described in any one of the above-described [4], [19] and [20], wherein a mixing ratio of the organic solvent with respect to the total amount of the brazing material is 25% by mass or less.

The present invention [22] includes the brazing material described in any one of the above-described [4] and [19] to [21], wherein a molecular weight of the organic solvent is 4000 or less.

The present invention [23] includes the brazing material described in any one of the above-described [1] to [22] further including a brazing material powder, wherein the brazing material powder is made of a metal capable of forming a eutectic alloy with aluminum and/or an alloy of the metal and aluminum.

The present invention [24] includes a brazing member including aluminum or an aluminum alloy, and a coating film formed by applying the brazing material described in any one of the above-described [1] to [23] to the aluminum or the aluminum alloy.

The present invention [25] includes a heat exchanger including the brazing member described in the above-described [24].

The present invention [26] includes a method for producing a brazing member including a processing step of processing a substrate made of aluminum or an aluminum alloy and an application step of heating and melting the brazing material described in any one of the above-described [1] to [23] and then, supplying the brazing material to a discharge device to be discharged to the substrate.

Effect of the Invention

Since the brazing material of the present invention is solid at 25° C., even when heated and melted, solidification thereof is faster than that of a liquid brazing material, and thus, it is possible to achieve simplification of the production line and improve workability.

Furthermore, since the brazing material of the present invention includes fluoride-based flux, a solidifying agent, and an organic viscosity reducing agent, it is possible to achieve low viscosity at the time of melting, and it has also excellent brazing properties and excellent application properties (liquid application properties) at the time of application to an object to be coated in a melting state (liquid state).

In addition, the brazing material of the present invention also has excellent application properties (solid application properties) when the brazing material is applied in contact with the object to be coated in a solid state.

Since the brazing member of the present invention includes a coating film formed by applying the brazing material of the present invention, it can have excellent brazing properties.

Since the heat exchanger of the present invention is obtained using the brazing member of the present invention, it can have excellent brazing properties.

Since the brazing material of the present invention is used in the method for producing a brazing member of the present invention, solidification of a coating film is fast, and it is not necessary to dry it. Therefore, according to the method for producing a brazing member of the present invention, a processing step of processing aluminum or an aluminum alloy, and an application step of discharging the brazing material can be carried out in the same production line, and it is possible to achieve the simplification of the production line and improve the workability.

BRIEF DESCRIPTION OF THE DRAWINGS

FIG. 3 shows a step of illustrating one embodiment of a method for producing a brazing member of the present invention:

DESCRIPTION OF EMBODIMENTS

Figure 1:
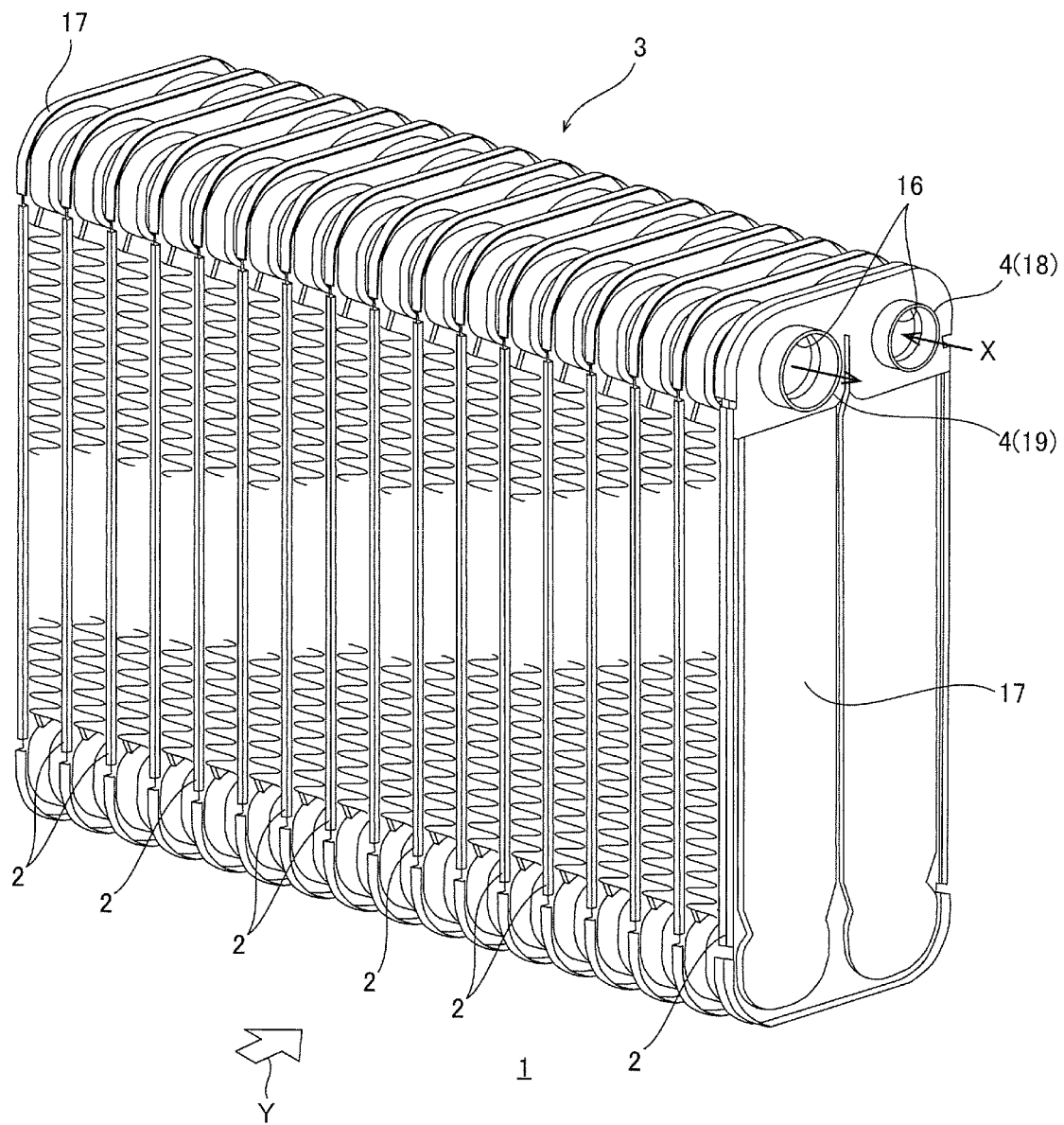
FIG. 1 shows a schematic perspective view illustrating one embodiment of a heat exchanger of the present invention.

A brazing material of the present invention is a brazing material for brazing aluminum or an aluminum alloy, and includes fluoride-based flux, a solidifying agent, and an organic viscosity reducing agent.

Examples of the fluoride-based flux include Cs—Al—F flux and K—Al—F flux.

The Cs—Al—F flux is fluoride-based flux containing cesium (Cs), aluminum (Al), and fluorine (F), and an example thereof includes cesium fluoroaluminate (non-reactive cesium-based flux). Specific examples thereof include $CsAlF_4$, $Cs_2AlF_6$, and $Cs_3AlF_6$.

The K—Al—F flux is fluoride-based flux containing potassium (K), aluminum (Al), and fluorine (F), and an example thereof includes potassium fluoroaluminate. Specific examples thereof include $KAlF_4$, $K_2AlF_5$, and $K_3AlF_6$.

As the fluoride-based flux, preferably, K—Al—F flux is used.

These fluoride-based flux may be used alone or in combination of two or more.

A mixing ratio of the fluoride-based flux with respect to the total amount of the fluoride-based flux, the solidifying agent, and the organic viscosity reducing agent (hereinafter, the fluoride-based flux, the solidifying agent, and the organic viscosity reducing agent are collectively referred to as a "brazing component") is, for example, 1% by mass or more, preferably 10% by mass or more, more preferably 20% by mass or more, further more preferably 30% by mass or more from the viewpoint of brazing properties (shortage of brazing), and is, for example, 80% by mass or less, preferably 60% by mass or less from the view point of low viscosity.

A content ratio of the brazing component with respect to the total amount of the brazing material is, for example, 50% by mass or more, preferably 70% by mass or more, and for example, 100% by mass or less. In a case where the brazing material includes a brazing filler metal to be described later, the content ratio of the brazing component with respect to the total amount of the brazing material is preferably 90% by mass or less, more preferably 80% by mass or less.

The solidifying agent is a component of adjusting a melting temperature so that the brazing material is solid at 25° C. and improving shape retention (excluding a gelling agent). In the present invention, 25° C. is a normal temperature. In addition, being in a solid state at 25° C. may be referred to as "normal temperature solid".

In the present invention, the solidifying agent is defined as at least one compound selected from the group consisting of a normal temperature solid hydrocarbon, a normal temperature solid alkyl alcohol, a normal temperature solid ether alcohol, and a high carbon carboxylic acid-high carbon alcohol ester.

The normal temperature solid hydrocarbon is a solid hydrocarbon at normal temperature, and examples thereof include normal temperature solid waxes such as a natural wax and a synthetic wax.

Examples of the natural wax include petroleum waxes such as a paraffin wax and a microcrystalline wax.

Examples of the synthetic wax include a polyethylene wax and a Fischer-Tropsch wax.

These normal temperature solid hydrocarbons may be used alone or in combination of two or more.

As the normal temperature solid hydrocarbon, preferably, a natural wax is used, more preferably, a paraffin wax is used.

A mixing ratio of the normal temperature solid hydrocarbon with respect to the total amount of the brazing component is, for example, 5% by mass or more, preferably 10% by mass or more, more preferably 16% by mass or more, further more preferably 27% by mass or more, further more preferably 30% by mass or more, further more preferably 50% by mass or more, and for example, 90% by mass or less from the viewpoint of shape retention, application properties, and appearance.

In particular, from the viewpoint of solid application properties, a mixing ratio of the normal temperature solid hydrocarbon with respect to the total amount of the brazing component is more preferably above 10% by mass, further more preferably 40% by mass or more, particularly preferably 60% by mass or more, and more preferably 85% by mass or less, further more preferably 80% by mass or less, particularly preferably 70% by mass or less.

In addition, from the viewpoint of balancing the liquid application properties and the solid application properties, a ratio of the normal temperature solid hydrocarbon with respect to the total amount of the brazing component is preferably 30% by mass or more, more preferably 40% by mass or more, and preferably 70% by mass or less, more preferably 60% by mass or less.

Further, a mixing ratio of the normal temperature solid hydrocarbon with respect to 100 parts by mass of the fluoride-based flux is, for example, 10 parts by mass or more, preferably 20 parts by mass or more, more preferably 100 parts by mass or more, further more preferably 150 parts by mass or more, and for example, 2000 parts by mass or less, preferably 1000 parts by mass or less, more preferably 500 parts by mass or less, further more preferably 300 parts by mass or less.

Examples of the normal temperature solid alkyl alcohol include normal alcohols having 10 to 30 carbon atoms (straight-chain alkyl alcohols) such as decanol, dodecanol, tetradecanol, hexadecanol, octadecanol (stearyl alcohol), and eicosanol; normal dialcohols having 9 to 30 carbon atoms; and polyhydric alcohols having 5 to 30 carbon atoms such as trimethylolpropane and pentaerythritol.

These normal temperature solid alkyl alcohols may be used alone or in combination of two or more.

A mixing ratio of the normal temperature solid alkyl alcohol with respect to the total amount of the brazing component is, for example, 5% by mass or more, preferably 10% by mass or more, more preferably 12% by mass or more, further more preferably 27% by mass or more, further more preferably 30% by mass or more, particularly preferably 50% by mass or more, and, for example, 90% by mass or less from the viewpoint of shape retention and application properties.

In particular, from the viewpoint of solid application properties, a mixing ratio of the normal temperature solid alkyl alcohol is more preferably 10% by mass or more, further more preferably 16% by mass or more, particularly preferably 30% by mass or more.

In addition, from the viewpoint of appearance, a mixing ratio of the normal temperature solid alkyl alcohol is more preferably 85% by mass or less, further more preferably 80% by mass or less, particularly preferably 70% by mass or less.

From the viewpoint of balancing the liquid application properties and the solid application properties, a ratio of the normal temperature solid alkyl alcohol with respect to the total amount of the brazing component is preferably 30% by mass or more, more preferably 40% by mass or more, and preferably 70% by mass or less, more preferably 60% by mass or less.

Further, a mixing ratio of the normal temperature solid alkyl alcohol with respect to 100 parts by mass of the fluoride-based flux is, for example, 10 parts by mass or more, preferably 20 parts by mass or more, more preferably 35 parts by mass or more, further more preferably 100 parts by mass or more, and for example, 2000 parts by mass or less, preferably 1000 parts by mass or less, more preferably 500 parts by mass or less, further more preferably 300 parts by mass or less.

Examples of the normal temperature solid ether alcohol include polyether alcohols including polyether glycols such as polyoxyethylene glycol, polyoxypropylene glycol, and polyoxybutylene glycol and polyether monools such as polyethylene glycol monomethyl ether and polyethylene glycol monoethyl ether.

A molecular weight of the polyether alcohol is adjusted so as to be in a solid state at 25° C. For example, in a normal temperature solid ether alcohol, a weight average molecular weight of the polyoxyethylene glycol is 1000 or more.

These normal temperature solid ether alcohols may be used alone or in combination of two or more.

From the viewpoint of shape retention and application properties, a mixing ratio of the normal temperature solid ether alcohol with respect to the total amount of the brazing component is, for example, 5% by mass or more, preferably 10% by mass or more, more preferably 12% by mass or more, further more preferably 27% by mass or more, further more preferably 30% by mass or more, particularly preferably 50% by mass or more, and for example, 90% by mass or less.

In particular, from the viewpoint of solid application properties, the mixing ratio of the normal temperature solid ether alcohol is more preferably 10% by mass or more, further more preferably 16% by mass or more, particularly preferably 30% by mass or more.

In addition, from the viewpoint of appearance, the mixing ratio of the normal temperature solid ether alcohol is more preferably 85% by mass or less, further more preferably 80% by mass or less, particularly preferably 70% by mass or less.

In addition, from the viewpoint of balancing the liquid application properties and the solid application properties, a ratio of the normal temperature solid ether alcohol with respect to the total amount of the brazing component is preferably 30% by mass or more, more preferably 40% by mass or more, and preferably 70% by mass or less, more preferably 60% by mass or less.

Further, a mixing ratio of the normal temperature solid ether alcohol with respect to 100 parts by mass of the fluoride-based flux is, for example, 10 parts by mass or more, preferably 20 parts by mass or more, more preferably 35 parts by mass or more, further more preferably 100 parts by mass or more, and for example, 2000 parts by mass or less, preferably 1000 parts by mass or less, more preferably 500 parts by mass or less, further more preferably 300 parts by mass or less.

The high carbon carboxylic acid-high carbon alcohol ester is an ester which is a reaction product of a carboxylic acid having 10 or more carbon atoms (described later) and an alcohol having 8 or more carbon atoms (described later).

More specifically, the high carbon carboxylic acid-high carbon alcohol ester is solid at 25° C. (normal temperature solid). Such a high carbon carboxylic acid-high carbon alcohol ester improves the shape retention of the brazing material.

Examples of the carboxylic acid having 10 or more carbon atoms include monocarboxylic acids having 10 or more carbon atoms such as capric acid, lauric acid, myristic acid, palmitic acid, and stearic acid and dicarboxylic acids having 10 or more carbon atoms such as decanedioic acid and dodecanedioic acid, and anhydrides thereof. They may be used alone or in combination of two or more.

Examples of the alcohol having 8 or more carbon atoms include monohydric alcohols having 8 or more carbon atoms such as octyl alcohol, lauryl alcohol, myristyl alcohol, cetyl alcohol, stearyl alcohol, oleyl alcohol, and linoleyl alcohol and polyhydric alcohols having 8 or more carbon atoms such as octanediol, nonanediol, decanediol, and dodecanediol. They may be used alone or in combination of two or more.

Then, the high carbon carboxylic acid-high carbon alcohol ester is obtained by subjecting 1 or more molecules of a carboxylic acid having 10 or more carbon atoms and 1 or more molecules of an alcohol having 8 or more carbon atoms to an esterification reaction by a known method.

More specifically, examples of the high carbon carboxylic acid-high carbon alcohol ester include a camauba wax, a candelilla wax, and a triacontanyl palmitate.

These high carbon carboxylic acid-high carbon alcohol esters may be used alone or in combination of two or more.

From the viewpoint of shape retention and application properties, a mixing ratio of the high carbon carboxylic acid-high carbon alcohol ester with respect to the total amount of the brazing component is, for example, 5% by mass or more, preferably 10% by mass or more, more preferably 12% by mass or more, further more preferably 27% by mass or more, further more preferably 30% by mass or more, particularly preferably 50% by mass or more, and for example, 90% by mass or less.

In particular, from the viewpoint of solid application properties, the mixing ratio of the high carbon carboxylic acid-high carbon alcohol ester is more preferably 10% by mass or more, further more preferably 16% by mass or more, particularly preferably 30% by mass or more.

In addition, from the viewpoint of appearance, the mixing ratio of the high carbon carboxylic acid-high carbon alcohol ester is more preferably 85% by mass or less, further more preferably 80% by mass or less, particularly preferably 70% by mass or less.

In addition, from the viewpoint of balancing the liquid application properties and the solid application properties, a ratio of the high carbon carboxylic acid-high carbon alcohol ester with respect to the total amount of the brazing component is preferably 30% by mass or more, more preferably 40% by mass or more, and preferably 70% by mass or less, more preferably 60% by mass or less.

Further, the mixing ratio of the high carbon carboxylic acid-high carbon alcohol ester with respect to 100 parts by mass of the fluoride-based flux is, for example, 10 parts by mass or more, preferably 20 parts by mass or more, more preferably 35 parts by mass or more, further more preferably 100 parts by mass or more, and for example, 2000 parts by mass or less, preferably 1000 parts by mass or less, more preferably 500 parts by mass or less, further more preferably 300 parts by mass or less.

These solidifying agents may be used alone or in combination of two or more.

As the solidifying agent, preferably, a normal temperature solid hydrocarbon is used alone and a normal temperature solid alkyl alcohol is used alone. As the solidifying agent, a normal temperature solid hydrocarbon and a normal temperature solid alkyl alcohol can be also used in combination. When a normal temperature solid hydrocarbon and a normal temperature solid alkyl alcohol are used in combination, a mixing ratio of the normal temperature solid hydrocarbon and a mixing ratio of the normal temperature solid alkyl alcohol are appropriately adjusted within the above-described range.

In addition, from the viewpoint of balancing the liquid application properties and the solid application properties, a ratio (total amount) of the solidifying agent with respect to the total amount of the brazing component is, for example, 5% by mass or more, preferably 10% by mass or more, more preferably 12% by mass or more, further more preferably 16% by mass or more, further more preferably 27% by mass or more, further more preferably 30% by mass or more, particularly preferably 40% by mass or more, and for example, 90% by mass or less, preferably 80% by mass or less, more preferably 70% by mass or less, further more preferably 60% by mass or less.

Further, a mixing ratio (total amount) of the solidifying agent with respect to 100 parts by mass of the fluoride-based flux is, for example, 10 parts by mass or more, preferably 20 parts by mass or more, more preferably 35 parts by mass or more, further more preferably 100 parts by mass or more, and for example, 2000 parts by mass or less, preferably 1000 parts by mass or less, more preferably 500 parts by mass or less, further more preferably 300 parts by mass or less.

The organic viscosity reducing agent is an organic compound for improving dispersibility of the fluoride-based flux in the brazing component.

Examples of the organic viscosity reducing agent include a surfactant and a low melting point organic compound (excluding the surfactant). The organic viscosity reducing agent preferably includes a surfactant and/or a low melting point organic compound, and more preferably consists of a surfactant and/or a low melting point organic compound.

The surfactant is a compound having a hydrophilic group and a hydrophobic group in combination, and examples thereof include a nonionic surfactant having a nonionic group as a hydrophilic group and an ionic surfactant having an ionic group and/or a salt thereof as a hydrophilic group.

An example of the nonionic surfactant includes a surfactant having a nonionic group (nonionic hydrophilic group) as a hydrophilic group and a long-chain hydrocarbon group as a hydrophobic group.

An example of the nonionic group includes a polyoxyalkylene group.

The polyoxyalkylene group is, for example, a condensation unit of an oxyalkylene (oxyethylene, oxy-1,2-propylene, and the like) unit, and examples thereof include a polyoxyethylene group, a polyoxypropylene group, a polyoxybutylene group, a polyoxyethylene-oxypropylene group (random/block), a polyoxyethylene-oxybutylene group (random/block), a polyoxypropylene-oxybutylene group (random/block), and a polyoxyethylene-oxypropylene-oxybutylene group (random/block).

From the viewpoint of hydrophilicity, as the polyoxyalkylene group, preferably, an oxyethylene unit is included, more preferably, a polyoxyethylene group is used.

The number of repeating units of the polyoxyalkylene group is not particularly limited, and preferably, is appropriately set so that the HLB value is within a range to be described later. More specifically, the number of repeating units of the polyoxyalkylene unit (polyoxyethylene group) is, for example, 3 or more, preferably 10 or more, more preferably 20 or more, further more preferably 25 or more, and for example, 100 or less, preferably 80 or less, more preferably 60 or less, further more preferably 50 or less.

An example of the long-chain hydrocarbon group includes a hydrocarbon group having 8 to 30 carbon atoms. Specifically, examples thereof include straight-chain hydrocarbon groups having 8 to 30 carbon atoms such as octyl group, nonyl group, decyl group, isodecyl group, undecyl group, dodecyl group (lauryl group), tridecyl group, tetradecyl group (myristyl group), paramityl group, cetyl group, stearyl group, arachidyl group, and behenyl group and cyclic hydrocarbon groups having 8 to 30 carbon atoms such as cyclooctyl group and cyclodecyl group.

They may be used alone or in combination of two or more.

The number of carbon atoms of the hydrophobic group of the nonionic surfactant is preferably 25 or less, more preferably 20 or less, further more preferably 18 or less, further more preferably 15 or less, and preferably 9 or more, more preferably 10 or more, further more preferably 12 or more from the viewpoint of application properties.

More specifically, examples of the nonionic surfactant include polyoxyethylene alkyl (8 to 30 carbon atoms) ethers such as polyoxyethylene octyl ether, polyoxyethylene decyl ether, polyoxyethylene lauryl ether, polyoxyethylene myristyl ether, polyoxyethylene palmityl ether, polyoxyethylene stearyl ether, polyoxyethylene octyl dodecyl ether, polyoxyethylene oleyl ether, polyoxyethylene arachidyl ether, and polyoxyethylene behenyl ether.

These nonionic surfactants may be used alone or in combination of two or more.

As the nonionic surfactant, preferably, a polyoxyethylene alkyl (8 to 30 carbon atoms) ether is used, more preferably, a polyoxyethylene alkyl (10 to 20 carbon atoms) ether is used.

An HLB value of the nonionic surfactant is, for example, 1.0 or more, preferably 3.0 or more, and for example, 19.0 or less, preferably 17.5 or less.

Examples of the ionic surfactant include an anionic surfactant, a cationic surfactant, and an amphoteric surfactant.

An example of the anionic surfactant includes a surfactant having an anionic group and/or a salt thereof as a hydrophilic group and having a long-chain hydrocarbon group as a hydrophobic group.

Examples of the anionic group include a carboxylic acid group, a sulfonic acid group, and a phosphoric acid group. They are used alone or in combination of two or more. As the anionic group, from the viewpoint of application properties, preferably, a carboxylic acid group and a sulfonic acid group are used. In other words, as the hydrophilic group, preferably, a carboxylic acid group, a carboxylic acid salt, a sulfonic acid group, and a sulfonic acid salt are used. As the anionic group, further more preferably, a sulfonic acid group and/or a salt thereof are/is used.

Further, examples of the salt of the anionic group include a metal salt (for example, sodium salt, potassium salt, and the like) and an amine salt. They are used alone or in combination of two or more. As the salt, preferably, a metal salt and an amine salt are used, more preferably, a metal salt is used, further more preferably, a sodium salt is used.

An example of the long-chain hydrocarbon group includes a hydrocarbon group having 8 to 30 carbon atoms described above. The long-chain hydrocarbon groups may be used alone or in combination of two or more.

The number of carbon atoms of the hydrophobic group of the anionic surfactant is preferably 25 or less, more preferably 20 or less, further more preferably 18 or less, further more preferably 15 or less, particularly preferably 12 or less from the viewpoint of application properties.

More specifically, examples of the anionic surfactant include fatty acid metal salts such as sodium laurate, sodium myristate, sodium palmitate, sodium stearate, sodium arachidate, and sodium behenate; fatty acid amine salts such as lauric acid amine salt, myristic acid amine salt, palmitic acid amine salt, stearic acid amine salt, arachidic acid amine salt, and behenic acid amine salt; metal salts of alkyl sulfate such as sodium lauryl sulfate, sodium myristyl sulfate, sodium palmityl sulfate, sodium stearyl sulfate, sodium arachidyl sulfate, and sodium behenyl sulfate, and amine alkyl sulfates such as amine lauryl sulfate, amine myristyl sulfate, amine palmityl sulfate, amine stearyl sulfate, amine arachidyl sulfate, and amine behenyl sulfate.

Examples of the anionic surfactants include alkyl succinamidate, alkyl sulfoacetate, alkyl phosphate, alkyl ether phosphate, acyl sarcosine salt, acyl isethionate, and acyl N-acyl taurine salt.

These anionic surfactants may be used alone or in combination of two or more.

As the anionic surfactant, from the viewpoint of improving the brazing properties (appearance), preferably, a fatty acid metal salt and a fatty acid amine salt are used, more preferably, a fatty acid metal salt is used.

An example of the cationic surfactant includes a surfactant having a cationic group and/or a salt thereof as a hydrophilic group and having a long-chain hydrocarbon group as a hydrophobic group.

Examples of the cationic group include an amino group and a quaternary ammonium group. These cationic groups may be used alone or in combination of two or more. As the cationic group, preferably, an amino group is used. That is, as the hydrophilic group, preferably an amino group and/or a salt thereof are/is used.

Further, examples of the salt of the cationic group include halogen salts (chloride, bromide, and the like), inorganic acid salts (hydrochloride, sulfate, phosphate, and the like), and organic acid salts (acetate and the like). They are used alone or in combination of two or more. As the salt, preferably, an organic acid salt is used, more preferably, an acetate is used.

An example of the long-chain hydrocarbon group includes a hydrocarbon group having 8 to 30 carbon atoms described above. They may be used alone or in combination of two or more.

The number of carbon atoms of the hydrophobic group of the cationic surfactant is preferably 25 or less, more preferably 20 or less, further more preferably 18 or less, further more preferably 15 or less, particularly preferably 12 or less from the viewpoint of application properties.

More specifically, examples of the cationic surfactant include amine organic acid salts such as laurylamine acetate, myristylamine acetate, palmitylamine acetate, stearylamine acetate, arachidylamine acetate, and behenylamine acetate and halogen salts of quaternary ammonium such as lauryltrimethylammonium chloride, myristyldimethylbenzylammonium chloride, cetyltrimethylammonium chloride, stearyltrimethylammonium chloride, stearyldimethylbenzylammonium chloride, and behenyltrimethylammonium chloride.

These cationic surfactants may be used alone or in combination of two or more.

As the cationic surfactant, preferably, an amine organic acid salt is used.

Examples of the amphoteric surfactant include alkyl betaine-type amphoteric surfactants, alkylamidobetaine-type amphoteric surfactants, imidazoline-type amphoteric surfactants, alkylaminosulfone-type amphoteric surfactants, alkylaminocarboxylic acid-type amphoteric surfactants, alkylamidocarboxylic acid-type amphoteric surfactants, amide amino acid-type amphoteric surfactants, and phosphate-type amphoteric surfactants. They may be used alone or in combination of two or more.

As an amphoteric surfactant, preferably, an alkyl betaine-type amphoteric surfactant is used.

An example of the alkyl betaine-type amphoteric surfactant includes a surfactant having a betaine group and/or a salt thereof as a hydrophilic group and having a long-chain hydrocarbon group as a hydrophobic group.

The betaine group is, for example, an amphoteric group having both the above-described anionic group (carboxylic acid group, sulfonic acid group, and the like) and the above-described cationic group (amino group and the like) in combination, preferably includes at least one anionic group selected from the group consisting of a carboxylic acid group, a carboxylic acid salt, a sulfonic acid group, and a sulfonic acid salt, and also preferably includes a cationic group consisting of an amino group and/or a salt thereof.

Specific examples of the betaine group include an aminoacetic acid betaine and an aminosulfate betaine. They may be used alone or in combination of two or more.

These hydrophilic groups of the amphoteric surfactant may be used alone or in combination of two or more.

An example of the long-chain hydrocarbon group includes a hydrocarbon group having 8 to 30 carbon atoms described above. They may be used alone or in combination of two or more.

The number of carbon atoms of the hydrophobic group of the amphoteric surfactant is preferably 25 or less, more preferably 20 or less, further more preferably 18 or less, further more preferably 15 or less, particularly preferably 12 or less from the viewpoint of application properties.

More specifically, examples of the amphoteric surfactant include a lauryl dimethylaminoacetate betaine, a myristyl dimethylaminoacetate betaine, a cetyl dimethylaminoacetate betaine, a stearyl dimethylaminoacetate betaine, a behenyl dimethylaminoacetate betaine, and a distearyl dimethylammonium chloride.

These amphoteric surfactants may be used alone or in combination of two or more.

These ionic surfactants may be used alone or in combination of two or more.

These surfactants may be used alone or in combination of two or more.

In other words, the surfactant may include at least one selected from the group consisting of a nonionic surfactant, an anionic surfactant, a cationic surfactant, and an amphoteric surfactant.

As the surfactant, from the viewpoint of improving the dispersibility and the application properties, preferably, a cationic surfactant and a nonionic surfactant are used, more preferably, a cationic surfactant is used.

In addition, from the viewpoint of improving the dispersibility and the application properties, as the surfactant, preferably, a nonionic surfactant and an ionic surfactant are used in combination. Specifically, a nonionic surfactant and an anionic surfactant are used in combination, a nonionic surfactant and a cationic surfactant are used in combination, and a nonionic surfactant and an amphoteric surfactant are used in combination, particularly preferably, a nonionic surfactant and a cationic surfactant are used in combination.

For example, when the nonionic surfactant and the anionic surfactant are used in combination, as a ratio of these, based on a mass of the solid content, a ratio of the nonionic surfactant with respect to the total amount of the surfactant is, for example, 1% by mass or more, preferably 10% by mass or more, more preferably above 50% by mass, further more preferably 60% by mass or more, and for example, 99% by mass or less, preferably 90% by mass or less, more preferably 85% by mass or less, further more preferably 80% by mass or less.

Further, a ratio of the anionic surfactant is, for example, 1% by mass or more, preferably 10% by mass or more, more preferably 15% by mass or more, further more preferably 20% by mass or more, and for example, 99% by mass or less, preferably 90% by mass or less, more preferably below 50% by mass, further more preferably 40% by mass or less.

In addition, for example, when the nonionic surfactant and the cationic surfactant are used in combination, as a ratio of these, based on a mass of the solid content, a ratio of the nonionic surfactant with respect to the total amount of the surfactant is, for example, 1% by mass or more, preferably 10% by mass or more, more preferably above 50% by mass, further more preferably 60% by mass or more, and for example, 99% by mass or less, preferably 90% by mass or less, more preferably 85% by mass or less, further more preferably 80% by mass or less.

Further, a ratio of the cationic surfactant is, for example, 1% by mass or more, preferably 10% by mass or more, more preferably 15% by mass or more, further more preferably 20% by mass or more, and for example, 99% by mass or less, preferably 90% by mass or less, more preferably below 50% by mass, further more preferably 40% by mass or less.

In addition, for example, when the nonionic surfactant and the amphoteric surfactant are used in combination, as a ratio of these, based on a mass of the solid content, a ratio of the nonionic surfactant with respect to the total amount of the surfactant is, for example, 1% by mass or more, preferably 10% by mass or more, more preferably above 50% by mass, further more preferably 60% by mass or more, and for example, 99% by mass or less, preferably 90% by mass or less, more preferably 85% by mass or less, further more preferably 80% by mass or less.

Further, a ratio of the amphoteric surfactant is, for example, 1% by mass or more, preferably 10% by mass or more, more preferably 15% by mass or more, further more preferably 20% by mass or more, and for example, 99% by mass or less, preferably 90% by mass or less, more preferably below 50% by mass, further more preferably 40% by mass or less.

When the combination ratio of the surfactants is within the above-described range, it is possible to further more excellently improve the dispersibility of the fluoride-based flux and improve the application properties and the brazing properties.

A mixing ratio (total amount) of the surfactant with respect to the total amount of the brazing material is, for example, 0.1% by mass or more, preferably 0.2% by mass or more, more preferably 0.5% by mass or more, and for example, 60% by mass or less, preferably 50% by mass or less, more preferably 10% by mass or less, further more preferably 5% by mass or less from the viewpoint of application properties.

Further, a mixing ratio (total amount) of the surfactant with respect to the total amount of the brazing component is, for example, 0.1% by mass or more, preferably 0.2% by mass or more, more preferably 0.5% by mass or more, and for example, 60% by mass or less, preferably 50% by mass or less, more preferably 10% by mass or less, further more preferably 5% by mass or less.

Further, a mixing ratio (total amount) of the surfactant with respect to 100 parts by mass of the fluoride-based flux is, for example, 0.2 parts by mass or more, preferably 1 part by mass or more, more preferably 3 parts by mass or more, further more preferably 5 parts by mass or more, and for example, 200 parts by mass or less, preferably 50 parts by mass or less, more preferably 30 parts by mass or less, further more preferably 10 parts by mass or less.

In addition, when the amphoteric surfactant is used as a surfactant, water is preferably blended together with the amphoteric surfactant.

A mixing ratio of water with respect to 100 parts by mass of the amphoteric surfactant, based on the mass is, for example, 100 parts by mass or more, preferably 200 parts by mass or more, and for example, 600 parts by mass or less, preferably 500 parts by mass or less.

The low melting point organic compound is an organic compound having a melting point of below 10° C. among the organic compounds which is liquid at normal temperature (that is, in a liquid state at 25° C.). That is, the low melting point organic compound exhibits a liquid state at 10° C. The low melting point organic compound is an organic compound excluding the surfactant.

More specifically, an example of the low melting point organic compound includes an organic solvent in a liquid state at 10° C. Examples of the organic solvent include hydrocarbons, halogenated hydrocarbons, alcohols, esters, ethers, and oils and fats.

Examples of the hydrocarbons include mineral spirit, solvent naphtha, turpentine, and normal decane.

Examples of the halogenated hydrocarbons include chlorotoluene, chlorobenzene, dichlorobenzene, and dibromobenzene.

Examples of the alcohols include alkyl alcohols in a liquid state at 10° C. (hereinafter, low melting point alkyl alcohols) and ether alcohols in a liquid state at 10° C. (hereinafter, low melting point ether alcohols).

Examples of the low melting point alkyl alcohol include normal alcohols (straight-chain alkyl alcohols) having 1 to 9 carbon atoms such as methanol, ethanol, propanol, butanol, hexanol, and octanol; branched alcohols having 1 to 30 carbon atoms such as octyldodecanol; dihydric alcohols having 1 to 8 carbon atoms such as butanediol, hexanediol, and neopentyl glycol; trihydric alcohols having 4 to 30 carbon atoms such as trimethylolethane and triethylolethane; and tetrahydric alcohols having 5 to 30 carbon atoms.

Examples of the low melting point ether alcohol include ether alcohols such as ethylene glycol monomethyl ether (methyl cellosolve) and ethylene glycol monoethyl ether (ethyl cellosolve); and polyether alcohols such as polyether glycols including polyoxyethylene glycol, polyoxypropylene glycol, and polyoxybutylene glycol and polyether monools including polyethylene glycol monomethyl ether and polyethylene glycol monoethyl ether.

A molecular weight of the polyether alcohol is adjusted so as to be in a liquid state at 10° C. For example, in the low melting point ether alcohol, a weight average molecular weight of the polyoxyethylene glycol is below 1000.

Examples of the esters include carboxylic acid esters such as butyl acetate, methoxybutyl acetate, benzyl acetate, phenyl acetate, methyl carbitol acetate, ethyl propionate, butyl propionate, methyl benzoate, and ethyl benzoate and glycerides such as methyl hexanoic acid triglyceride and ethyl hexanoic acid triglyceride.

Examples of the ethers include chain ethers such as dimethyl ether, diethyl ether, methylethyl ether, dimethoxy ethane, and dimethoxy methane and cyclic ethers such as tetrahydrofuran and 2-methyltetrahydrofuran.

Examples of the oils and fats include soybean oil, bran oil, jojoba oil, avogad oil, almond oil, olive oil, cocoa oil, sesame oil, persic oil, castor oil, and coconut oil.

These low melting point organic compounds may be used alone or in combination of two or more.

As the low melting point organic compound, preferably, hydrocarbons, halogenated hydrocarbons, alcohols, esters, ethers, and oils and fats are used, more preferably, alcohols, esters, and ethers are used, further more preferably, alcohols and esters are used.

Further, as the alcohols, preferably, a low melting point alkyl alcohol and a low melting point ether alcohol are used, more preferably, an alkyl alcohol having 6 to 9 carbon atoms and a polyether alcohol are used. Further, as the esters, preferably, a glyceride is used.

As the low melting point organic compound, more preferably, alcohols are used, particularly preferably, a polyether glycol is used.

Further, as the low melting point organic compound, preferably, a compound having a hydrophilic group and a hydrophobic group in combination is used in the same manner as the surfactant. Examples of the hydrophilic group include a hydroxyl group and an ester group.

Examples of the hydrophobic group include a long-chain hydrocarbon group and an oxyalkylene group having 3 to 4 carbon atoms.

Examples of the organic solvent include an alkyl alcohol having 6 to 9 carbon atoms, a polyoxyalkylene (3 to 4 carbon atoms) glycol, and a glyceride having 6 to 20 carbon atoms.

A molecular weight of the low melting point organic compound is, for example, 30 or more, preferably 50 or more, more preferably 100 or more, and for example, 5000 or less, preferably 4000 or less, more preferably 3000 or less, more preferably 2500 or less.

When the low melting point organic compound is a monomer, a molecular weight thereof can be calculated from the molecular skeleton and the number of atoms. In addition, when the low melting point organic compound is a polymer, the molecular weight thereof as the number average molecular weight is determined as a molecular weight in terms of standard polystyrene by gel permeation chromatography measurement. Then, the molecular weight of the low melting point organic compound is calculated as an average value of the molecular weight of each component.

In addition, when the low melting point organic compound is a polymer having a hydroxyl group and an average functionality (number of hydroxyl groups per molecule) is apparent from the molecular structure, the average molecular weight thereof as the calculated number average molecular weight is determined by the following formula.

(Average Molecular Weight)=(mole mass of KOH)×
Average Functionality×1000/(Hydroxyl Value)

In the formula, the hydroxyl value can be measured by the method described in JIS K1557-1 (2007).

A content ratio of the low melting point organic compound with respect to the total amount of the brazing material is, for example, 60% by mass or less, preferably 55% by mass or less, more preferably 50% by mass or less, further more preferably 40% by mass or less, particularly preferably 25% by mass or less, and for example, 1% by mass or more, preferably 10% by mass or more, more preferably 15% by mass or more from the viewpoint of application properties and solidification properties.

Further, the content ratio of the low melting point organic compound with respect to the total amount of the brazing component is, for example, 60% by mass or less, preferably 55% by mass or less, more preferably 50% by mass or less, further more preferably 40% by mass or less, particularly preferably 25% by mass or less, and for example, 1% by mass or more, preferably 10% by mass or more, more preferably 15% by mass or more.

Further, a mixing ratio of the low melting point organic compound with respect to 100 parts by mass of the fluoride-based flux is, for example, 5 parts by mass or more, preferably 10 parts by mass or more, more preferably 30 parts by mass or more, further more preferably 50 parts by mass or more, and for example, 1000 parts by mass or less, preferably 300 parts by mass or less, more preferably 200 parts by mass or less, further more preferably 100 parts by mass or less.

These organic viscosity reducing agents may be used alone or in combination of two or more.

In other words, as the organic viscosity reducing agent, the surfactant may be used alone, the low melting point organic compound may be used alone, and furthermore, the surfactant and the low melting point organic compound may be used in combination.

A content ratio (total amount) of the organic viscosity reducing agent with respect to the total amount of the brazing material is, for example, 0.1% by mass or more, preferably 0.2% by mass or more, more preferably 0.5% by mass or more, further more preferably 1.0% by mass or more, particularly preferably 1.5% by mass or more, and for example, 60% by mass or less, preferably 55% by mass or less, more preferably 50% by mass or less, further more preferably 40% by mass or less, particularly preferably 25% by mass or less from the viewpoint of application properties.

Further, a mixing ratio (total amount) of the organic viscosity reducing agent with respect to 100 parts by mass of the fluoride-based flux is, for example, 0.2 parts by mass or more, preferably 1 part by mass or more, more preferably 3 parts by mass or more, further more preferably 5 parts by mass or more, and for example, 1000 parts by mass or less, preferably 300 parts by mass or less, more preferably 30 parts by mass or less, further more preferably 20 parts by mass or less, particularly preferably 10 parts by mass or less.

In addition, if necessary, the brazing material can include a brazing filler metal.

Examples of the brazing filler metal include a brazing filler metal made of a metal that can form a eutectic alloy with aluminum, and a brazing filler metal made of an alloy of the metal and the aluminum.

More specifically, examples of the brazing filler metal include a metal silicon, a silicon-aluminum alloy, and these alloys containing a small amount of magnesium, copper, and germanium.

Further, the brazing filler metal is preferably prepared in a powder form. That is, as the brazing filler metal, preferably, a brazing filler metal powder is used. An average particle size of the brazing metal filler powder is not particularly limited, and is appropriately set in accordance with the purpose and the application.

When the brazing material includes the brazing filler metal, it has excellent work efficiency in the brazing of the aluminum and the aluminum alloy.

A mixing ratio of the brazing filler metal with respect to 100 parts by mass of the brazing component is, for example, 3 parts by mass or more, preferably 5 parts by mass or more, more preferably 10 parts by mass or more, and for example, 300 parts by mass or less, preferably 100 parts by mass or less, more preferably 50 parts by mass or less, further more preferably 30 parts by mass or less.

Further, the mixing ratio of the brazing filler metal with respect to the total amount of the brazing material is, for example, 1% by mass or more, preferably 10% by mass or more, more preferably 20% by mass or more, and for example, 60% by mass or less, preferably 40% by mass or less, more preferably 30% by mass or less.

In addition, the brazing material may contain, if necessary, various additives at a ratio of 5% by mass or less with respect to the total amount of the brazing material. Examples of the additive include antioxidants (for example, dibutylhydroxytoluene and the like), corrosion inhibitors (for example, benzotriazole and the like), defoaming agents (for example, silicone oil and the like), thickeners (for example, fatty acid amide, polyamide, and the like), and colorants.

The brazing material may contain a gelling agent, if necessary, and preferably does not contain a gelling agent from the viewpoint of brazing properties (appearance).

Then, the brazing material can be obtained by mixing and stirring each of the above-described components at the above-described mixing ratio by a known method. At this time, the fluoride-based flux is dispersed by the organic viscosity reducing agent, and the brazing material is solidified by the solidifying agent.

That is, the above-described brazing material is solid, and specifically, is solid at 25° C.

Solid at 25° C. is defined as "not in liquid form" as a result of the test conducted at 25° C. in accordance with the method described in the "Method of Confirmation of Liquid Status" described in the "Notice No. 11 of the Office of Hazardous Materials Regulation-Cabinet Order for Partial Revision of the Cabinet Order Concerning the Control of Hazardous Materials (Part Relating to Examination and Property of Hazardous Materials) and the Promulgation of the Ministerial Order on Examination and Property of Hazardous Materials (Notification)".

The brazing material is softened by heating.

More specifically, when, for example, the above-described brazing material is applied to the aluminum or the aluminum alloy, as the details are described later, the solid brazing material is softened and melted by heating.

A heating temperature is, for example, 40° C. or more, preferably 60° C. or more, more preferably 70° C. or more, further more preferably 80° C. or more, particularly preferably 90° C. or more, and for example, 400° C. or less, preferably 300° C. or less, more preferably 200° C. or less, further more preferably 180° C. or less, particularly preferably 150° C. or less.

That is, particularly preferably, the above-described brazing material is melted at 150° C. or less. In other words, the brazing material is preferably in a melting state at least at 150° C.

In such a case, the viscosity at 150° C. (melting state) of the brazing material is, for example, 0.001 Pa s or more, preferably 0.003 Pa s or more, more preferably 0.006 Pa s or more, further more preferably 0.02 Pa s or more, particularly preferably 0.05 Pa s or more, and for example, 300 Pa s or less, preferably 100 Pa s or less, more preferably 10 Pa s or less, further more preferably 5 Pa s or less, further more preferably 1 Pa s or less, particularly preferably 0.1 Pa s or less.

When the viscosity at 150° C. is within the above-described range, it is possible to obtain particularly excellent application properties.

The viscosity at 150° C. is measured with a rheometer in conformity with Examples to be described later.

A melted material of the brazing material is then applied to the aluminum or the aluminum alloy to subsequently form a coating film by solidification (solid coating film).

An application method is not particularly limited, and examples thereof include a brush coating method, a roll coating method, a spin coating method, a dip coating method, a spray coating method, a bar coating method, a knife coating method, a dye coating method, an inkjet method, a jet dispensing method, and a gravure coating method. From the viewpoint of application properties and coating film solidification properties, preferably, a jet dispensing method is used.

By applying the brazing material by the jet dispensing method, it is possible to more accurately apply the brazing material to a desired position, and also, it is possible to quickly solidify the brazing material to obtain a desired solidified coating film.

A thickness of the solidified coating film may be appropriately set in accordance with the purpose and the application.

Then, since such a brazing material is solid at 25° C., it is possible to improve the workability in brazing of the aluminum or the aluminum alloy.

That is, for example, the application of the liquid or paste-like brazing material to a metal member may contaminate the application facility and the surroundings thereof with the low melting point organic compound, and there is a problem of taking the labor and time in the maintenance of the facility.

On the other hand, when the solid brazing material is heated at 25° C., melted, and applied, the scattering of the brazing material droplets can be reduced, so that the contamination of the application facility and the surroundings thereof can be suppressed.

In addition, since the above-described brazing material is solid at 25° C., the solidification is faster than that of the liquid brazing material even after heating and melting, so that it is possible to achieve the simplification of the production line and improve the workability.

Furthermore, since the above-described brazing material includes the fluoride-based flux, the solidifying agent, and the organic viscosity reducing agent, it is possible to achieve the low viscosity at the time of melting, and it also has excellent brazing properties and excellent application properties (liquid application properties).

In addition, the above-described brazing material also has excellent application properties when applied in contact with an object to be coated in a solid state.

Therefore, the above-described brazing material is preferably used for the aluminum or an aluminum alloy product. Specifically, the above-described brazing material is preferably used in the production of a brazing member including the aluminum or the aluminum alloy, or in the production of a heat exchanger using the brazing member.

In the following, the brazing member and the heat exchanger are described in detail.

In FIG. 1, a heat exchanger 1 is, for example, a laminated heat exchanger used in an air conditioner or the like, and has a known laminated structure.

Specifically, the heat exchanger 1 includes a tube laminate 3 formed by laminating a plurality of plate connecting tubes 2 and a refrigerant supply and discharge pipe 4 for supplying and discharging a refrigerant to the tube laminate 3.

Figure 2:
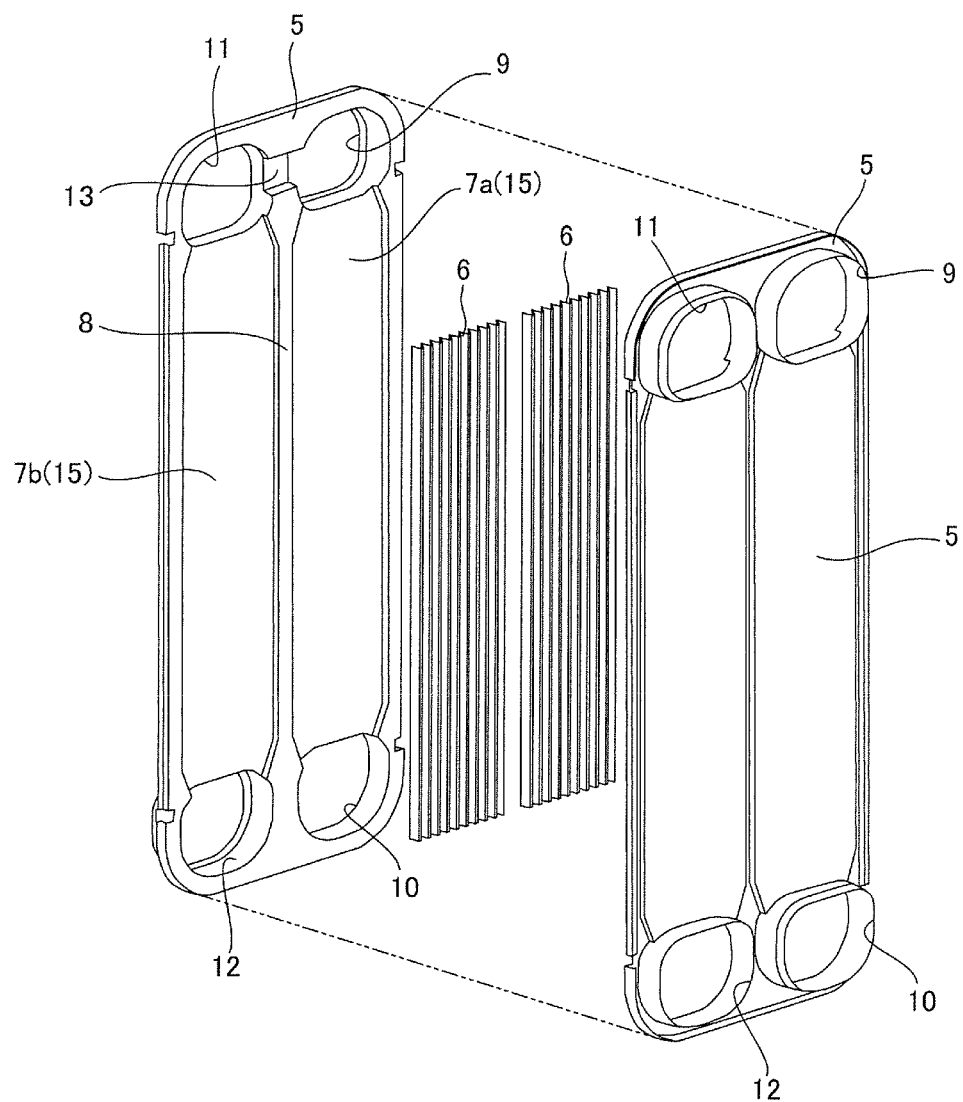
FIG. 2 shows an exploded perspective view of a plate connecting tube used in the heat exchanger shown in FIG. 1.

In the tube laminate 3, the plate connecting tube 2 is a hollow member having a generally flat shape, and as shown in FIG. 2, includes a pair of (two) plate members 5 disposed opposite to each other and two inner fins 6 disposed at the inside of the plate members 5.

Each of the plate members 5 is a member (Al member) made of the aluminum or the aluminum alloy, has a generally long rectangular shape when viewed from the top, and has a generally rectangular recessed portion 7 when viewed from the top extending along a longitudinal direction in a generally central portion in the longitudinal direction thereof (region excluding both end portions in the longitudinal direction).

In the recessed portion 7, a protruding portion 8 (rib) extending along the longitudinal direction of the recessed portion 7 is erected in the central portion in a width direction perpendicular to the longitudinal direction. That is, the recessed portion 7 is divided into a recessed portion 7*a* at one side in the width direction and a recessed portion 7*b* at the other side in the width direction by the protruding portion 8.

Further, a first through hole 9 is formed in one-side end portion in the longitudinal direction of the recessed portion 7*a*.

Further, a second through hole 10 is formed in the other-side end portion in the longitudinal direction of the recessed portion 7*a*.

Further, a third through hole 11 is formed in one-side end portion in the longitudinal direction of the recessed portion 7*b*.

Further, a fourth through hole 12 is formed in the other-side end portion in the longitudinal direction of the recessed portion 7*b*.

A groove 13 is formed between the first through hole 9 and the third through hole 11, and thus, a refrigerant (described later) is allowed to flow between the first through hole 9 and the third through hole 11. The groove 13 is not formed between the second through hole 10 and the fourth through hole 12, and they are independent of each other.

The inner fin 6 is a member (Al member) made of the aluminum or the aluminum alloy, and one inner fin 6 is provided in the recessed portion 7*a* and one inner fin 6 is provided in the recessed portion 7*b* (two in total). Specifically, each of the inner fins 6 has a corrugated plate shape having generally the same size as the recessed portion 7*a* and the recessed portion 7*b*, and can be accommodated in a refrigerant passage 15 (described later).

Then, as the details are described later, the plate connecting tube 2 is formed by brazing the pair of plate members 5 and the inner fin 6 described above.

As shown in FIG. 1, the plurality of obtained plate connecting tubes 2 are laminated so that the first through hole 9, the second through hole 10, the third through hole 11, and the fourth through hole 12 are overlapped with each other to form a refrigerant supply and discharge passage 16. Then, the laminated plate connecting tubes 2 are fixed by outer plates 17 from both sides in a laminating direction.

More specifically, the first through hole 9, the second through hole 10, the third through hole 11, and the fourth through hole 12 are sealed by the outer plate 17 at one side (rear side) in the laminating direction. On the other hand, the third through hole 11 and the fourth through hole 12 are sealed by the outer plate 17 at the other side (front side) in the laminating direction, and the first through hole 9 and the second through hole 10 are opened.

Thus, the tube laminate 3 is obtained. In the tube laminate 3, if necessary, a partition plate for adjusting the flow path of the refrigerant and an outer fin for improving the heat exchange efficiency may be provided between the plate connecting tubes 2.

The refrigerant supply and discharge pipe 4 includes a refrigerant supply pipe 18 for supplying a refrigerant to the tube laminate 3, and a refrigerant discharge pipe 19 for discharging the refrigerant from the tube laminate 3.

One-side end portion of the refrigerant supply pipe 18 is connected to the first through hole 9, and the other-side end portion thereof is connected to a refrigerant tank which is not shown. In the refrigerant tank, for example, a known refrigerant such as hydrofluoroolefin is stored.

One-side end portion of the refrigerant discharge pipe 19 is connected to the second through hole 10, and the other-side end portion thereof is connected to a refrigerant collection tank which is not shown.

Then, in the heat exchanger 1, by supplying a refrigerant X from the refrigerant supply pipe 18 to the refrigerant passage 15 at the inside of the plate connecting tube 2, heat exchange of the refrigerant X flowing at the inside of the tube laminate 3 with air Y for air conditioning flowing at the outside of the tube laminate 3 is carried out, and it is possible to cool the air Y for air conditioning.

In the following, a method for producing the plate connecting tube 2 and a brazing plate 20 as a brazing member for obtaining the plate connecting tube 2 is described in detail.

That is, in the production of the plate connecting tube 2, first, the brazing plate 20 including the plate member 5 (Al member) and a coating film 29 of the brazing material formed on the surface of the plate member 5 is produced, and then, the obtained brazing plate 20 and the above-described inner fin 6 are brazed.

In the production of the brazing plate 20, for example, as shown in FIG. 3, a substrate 22 (hereinafter, referred to as an Al substrate) made of the aluminum or the aluminum alloy on a thin plate is prepared to process the Al substrate 22, and then, the above-described brazing material is applied to the Al substrate 22.

In FIG. 3, the Al substrate 22 is, for example, moved in a predetermined direction by a moving device 23 such as a belt conveyor (for example, from the left to the right on the plane of the sheet).

Then, FIG. 3A (processing step) and FIG. 3B (application step) shown below are continuously carried out from the upstream side toward the downstream side of the moving device 23 in order.

Figure 3A:
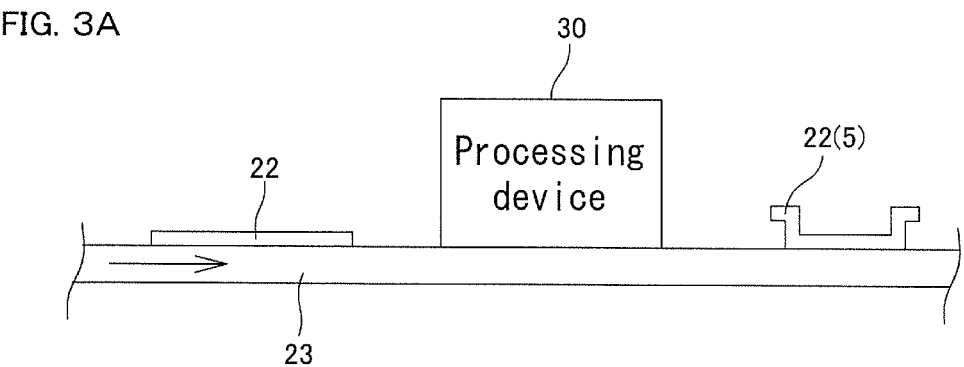
FIG. 3A illustrating a step of processing an Al substrate.

That is, in this method, as referred to FIG. 3A, first, the Al substrate 22 is processed (processing step).

More specifically, in the production line, while the Al substrate 22 is intermittently moved in a predetermined direction, the Al substrate 22 is processed and formed into a predetermined shape (for example, shape of the plate member 5 described above).

The processing method is not particularly limited, and for, example, a known processing device 30 such as a press processing device, a bending processing device, and a cutting processing device is used.

Thus, the plate member 5 (ref: FIG. 2) is obtained as the Al substrate 22 after processing.

Figure 3B:
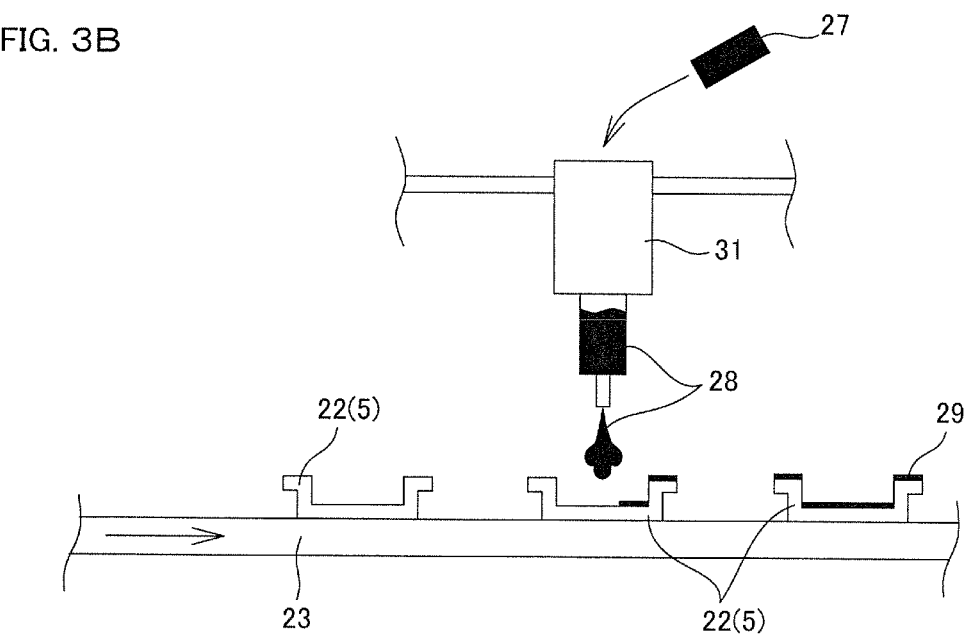
FIG. 3B illustrating a step of continuously applying a brazing material to the Al substrate.

Then, in this method, as shown in FIG. 3B, a brazing material 27 described above is heated and melted, and a resulting liquid melting composition 28 is applied to the plate member 5 (application step).

More specifically, in the application step, the melting composition 28 of the brazing material 27 is applied to the recessed portion 7 of the plate member 5 (ref: FIG. 2).

For example, as described above, a heating temperature of the brazing material 27 is, for example, 40° C. or more, preferably 60° C. or more, more preferably 70° C. or more, further more preferably 80° C. or more, particularly preferably 90° C. or more, and for example, 400° C. or less, preferably 300° C. or less, more preferably 200° C. or less, further more preferably 180° C. or less, particularly preferably 150° C. or less.

Further, a method of applying the melting composition 28 is not particularly limited, and a jet dispensing method is preferably used when the application region is narrow and the precise application is required. That is, preferably, the melting composition 28 is supplied to a discharge device 31 such as a jet dispenser, and is discharged toward the plate member 5 (the Al substrate 22).

The discharge conditions (temperature, pressure, and the like) in the discharge device 31 (jet dispenser and the like) are appropriately set in accordance with the purpose and the application.

By using the discharge device 31 (jet dispenser and the like), the melting composition 28 can be more accurately applied to a desired position, and can be solidified quickly to obtain the desired coating film (solidified coating film) 29.

That is, since the solidification of the above-described brazing material 27 is faster than that of the liquid brazing material when heated and melted, the above-described brazing material 27 is spontaneously solidified without a drying step, and the coating film 29 can be formed. Therefore, the above-described brazing material 27 has excellent industrial productivity of the coating film 29.

A thickness of the coating film 29 is not particularly limited, and is, for example, 1 μm or more, preferably 5 μm or more, and for example, 1000 μm or less, preferably 200 μm or less.

Thus, the brazing plate 20 including the plate member 5 (the Al substrate 22) and the coating film 29 can be obtained.

Then, since the brazing plate 20 includes the coating film 29 formed by applying the above-described brazing material 27 to the plate member 5 (the AL substrate 22), it can have excellent brazing properties.

Therefore, the resulting brazing plate 20 is preferably used in the production of the plate connecting tube 2 and the heat exchanger 1.

More specifically, as referred to FIGS. 1 and 2, the pair of brazing plates 20 (the plate members 5) are oppositely disposed, and the inner fins 6 are disposed between the pair of brazing plates 20 (the plate members 5) so as to correspond to the recessed portion 7a and the recessed portion 7b.

Then, each of the inner fins 6, the recessed portion 7a, and the recessed portion 7b are brazed, and along with this, the contact portions (peripheral end edges and the protruding portions 8) of the pair of brazing plates 20 (the plate members 5) are brazed to each other.

Thus, the pair of brazing plates 20 (the plate members 5) are connected, and the recessed portion 7a and the recessed portion 7b facing each other form a hollow space to form the two refrigerant passages 15. Further, the inner fin 6 is fixed to the refrigerant passage 15.

In this way, it is possible to obtain the plate connecting tube 2, and by laminating the plate connecting tube 2, it is also possible to obtain the heat exchanger 1.

Since the obtained heat exchanger 1 is obtained using the brazing plate 20 described above, it can have excellent brazing properties.

In addition, in the method for producing the brazing plate 20 described above, since the above-described brazing material 27 is used, the solidification of the coating film 29 is fast.

Therefore, according to the method for producing the brazing plate 20 described above, the processing step of processing the Al substrate 22 (aluminum or aluminum alloy) and the application step of discharging the brazing material 27 can be carried out in the same production line, and it is possible to achieve the simplification of the production line and improve the workability.

Therefore, the brazing member and the heat exchanger described above can be, for example, preferably used as a heat exchanger for an air conditioner used in a cabin of an automobile and a room of a house.

In the above-described description, the melting composition 28 obtained by heating the solid brazing material 27 is applied to the plate member 5. Alternatively, the solid brazing material 27 can be also applied by being brought into contact with the plate member 5 without melting in a solid state and by rubbing if necessary.

In such a case, an example of the application method includes a method in which as described in International Publication WO2018/235906, the plate member 5 is wound with a roll-type conveyance device or the like in a state where the long plate member 5 and the brazing material 27 are in contact with each other, and the plate member 5 is relatively moved with respect to the brazing material 27. By the method, the solid brazing material 27 is shaved, and the shaved brazing material 27 is attached (applied) to the plate member 5.

Then, by using the above-described brazing material 27, it also has excellent application properties when applied in contact with an object to be coated in a solid state.

EXAMPLES

Next, the present invention is described based on Examples and Comparative Examples. The present invention is however not limited by the following Examples. All designations of "part" or "parts" and "%" mean part or parts by mass and % by mass, respectively, unless otherwise particularly specified in the following description. The specific numerical values in mixing ratio (content ratio), property value, and parameter used in the following description can be replaced with upper limit values (numerical values defined as "or less" or "below") or lower limit values (numerical values defined as "or more" or "above") of corresponding numerical values in mixing ratio (content ratio), property value, and parameter described in the above-described "DESCRIPTION OF EMBODIMENTS".

1. Production of Brazing Material

Example 1

A brazing material was obtained in accordance with the mixing formulation shown in Table 1.

Specifically, 33.3 parts of aluminate fluoride potassium flux, 64.7 parts of a paraffin wax, and 2.0 parts of a surfactant (polyoxyethylene lauryl ether, HLB: 16.9) were heated and mixed, poured into a predetermined mold, and cooled and molded, thereby obtaining a brazing material.

The brazing material was solid at 25° C.

Examples 2 to 69 and Comparative Examples 1 to 2

A brazing material was obtained in the same manner as in Example 1, except that the mixing formulation was changed to that shown in Tables 1 to 8.

As a brazing filler metal, Al-12% Si is an Al brazing filler metal containing 12% of Si (trade name: ECKA Aluminium-Silicon 12AN<0.025 mm, manufactured by ECKA Granules Germany GmbH).

Further, as the brazing filler metal, Si is a Si brazing filler metal (trade name: M-Si SH-2 fine powder, product of 45 μm, manufactured by KINSEI MATEC CO., LTD.).

2. Viscosity at Melting at 150° C.

Each of the brazing materials of Examples and Comparative Examples was heated at 150° C. and melted, and then, the viscosity at a shear rate of 2/s was measured using a rheometer (manufactured by Anton Paar GmbH, Physica MCR 301, jig: PP25, measurement position: 0.5 mm), while kept at 150° C.

When the brazing material contained a component boiled at 150° C. or less (referred to as a low boiling point component) such as water and a low melting point organic compound, the viscosity was measured at temperature of three points (for example, 60° C., 75° C., and 90° C. in Examples 19 and 20) which was the temperature at which an organic component of the brazing material melted or more and the boiling point of the low boiling point component or less, and the viscosity at 150° C. was calculated by linear extrapolation.

The viscosity at the melting at 150° C. is shown in Tables 1 to 8.

3. Evaluation (1) Application Properties
(1-1) Liquid Application Properties

After each of the brazing materials of Examples and Comparative Examples was heated at 95° C. and melted, it was supplied to a discharge device (non-contact-type jet dispenser, manufactured by Musashi Engineering, Inc., hot melt-compatible AeroJet (syringe: PSY-30FH-P, rod: M35-2582-079-00, valve sheet: V, nozzle caliber: 0.29 mm)), and one shot was discharged to an aluminum member (150 mm× 70 mm× 0.8 mm) under the conditions of spring: 100%, nozzle temperature control: 95° C., syringe temperature control: 120° C., syringe pressure: 30 kPa, stroke: 0.3 mm, on time: 2 msec, and clearance: 1 mm to fabricate a test piece. Then, an amount of application of the fluoride-based flux in the applied range was evaluated as superior or inferior based on the following criteria. The results are shown in Tables 1 to 8.

In addition, a case where the brazing material can be stably applied and a thinner coating film can be formed was defined as a case with excellent application properties.

S: The application was carried out at 5 g/m² or more and below 20 g/m².
A: The application was carried out at 20 g/m² or more and below 50 g/m².
B: The application was carried out at 50 g/m² or more and below 150 g/m².
C: The application was carried out at 150 g/m² or more and below 300 g/m².
D: The application was carried out at 300 g/m² or more.
E: The application was carried out at 300 g/m² or more without stability.
Bad: Discharge was not carried out due to clogging in the discharge device.

(1-2) Solid Application Properties

Each of the brazing materials of Examples and Comparative Examples was melted at 100° C., fed into a cylindrical mold (10-cm aluminum siphon cake mold) with a diameter of 10 cm (inner diameter of 9 cm), and left to stand at room temperature for one hour to be solidified. A rotational axis was inserted into the inner space of the obtained cylindrical sample, and the sample was shaved so that a width of the curved surface was 5 cm and the curved surface was parallel to the rotational axis to produce a sample for application.

Subsequently, the obtained cylindrical sample was set in a solid material pressing machine (manufactured by DAISEKI Co., Ltd.) and pressed against an aluminum substrate (length: 250 m, width: 5 cm, thickness: 100 μm) conveyed at 150 m/min. At this time, the rotational axis of the sample was rotated at 2000 rpm with a drill (manufactured by Makita Corporation, DF-458D), with a set load of 10 kg.

Thus, the aluminum substrate in which the brazing material was applied in a solid state was obtained. Thereafter, an amount of application of the fluoride-based flux in the applied range was evaluated as superior or inferior based on the following criteria. The results are shown in Tables 1 to 8.

In addition, a case where the brazing material can be stably applied and a thinner coating film can be formed was defined as a case with excellent application properties.

S: The application was carried out at 0.5 g/m² or more and below 10 g/m².
A: The application was carried out at 10 g/m² or more and below 20 g/m².
B: The application was carried out at 20 g/m² or more and below 50 g/m².
C: The application was carried out at 50 g/m² or more and below 150 g/m².
D: The application was carried out at 150 g/m² or more and below 300 g/m² without stability.
Bad: The application was not carried out due to extremely soft sample.
*: The brazing material was melted at 100° C. and fed into a cylindrical mold. However, it was not possible to evaluate the application properties because the melted brazing material was not a homogeneous-shaped liquid, and the required cylindrical and solid brazing material could not be obtained. The phenomenon of not becoming a liquid having a homogeneous shape was the same even when heated to a further higher temperature than 100° C.

(2) Coating Film Solidification Properties

After each of the brazing materials of Examples and Comparative Examples was heated at 95° C. and melted, it was supplied to a discharge device (non-contact-type jet dispenser, manufactured by Musashi Engineering, Inc., hot melt-compatible AeroJet (syringe: PSY-30FH-P, rod: M35-2582-079-00, valve sheet: V, nozzle caliber: 0.29 mm)), and one shot was discharged to an aluminum member (150 mm× 70 mm× 0.8 mm) under the conditions of spring: 100%, nozzle temperature control: 95° C., syringe temperature control: 95° C., syringe pressure: 30 kPa, stroke: 0.3 mm, on time: 2 msec, and clearance: 1 mm to fabricate a test piece. Then, the superiority and the inferiority were evaluated based on the following criteria. The results are shown in Tables 1 to 8.

A: Immediately after the application, a solid coating film was formed.
B: After the application, a liquid coating film was formed, and when it was left to stand at 25° C. for 30 seconds, it became a solid coating film.
C: After the application, a liquid coating film was formed, and when it was left to stand at 25° C. for one minute, it became a solid coating film.
Bad: After the application, a liquid coating film was formed, and even when it was left to stand at 25° C. for one minute, it remained in a liquid coating film.

(3) Brazing Properties
(3-1) Appearance

Each of the brazing materials of Examples and Comparative Examples was heated at 90° C. and melted, and then, applied to an aluminum member (150 mm× 70 mm× 0.8 mm) with a 10-mm diameter circle so that an amount of application of the fluoride-based flux was 10 g/m², and a test piece was produced.

Thereafter, the above-described test piece was heated at 600° C. and brazed using a brazing furnace (box-type electric oven, manufactured by NORITAKE TCF, Co., Limited, A (V)-DC-M) under a nitrogen gas atmosphere (oxygen concentration of 100 ppm or less).

Then, the superiority and the inferiority of the performance were evaluated in the following test. The results are shown in Tables 1 to 8.

The appearance after the brazing test was visually evaluated based on the following criteria.

A: Black was hardly seen.

B: Black was seen in a part of the application region.

Bad: Strong black was clearly seen throughout the application region.

(3-2) Shortage of Brazing

After each of the brazing materials of Examples and Comparative Examples was heated at 90° C. and melted, it was applied to the entire surface of an aluminum member (JIS-BAS121P (cladding rate of 10%), 60 mm× 25 mm× 1.0 mm) made of a brazing sheet clad with a silicon-aluminum alloy (brazing filler metal) on an aluminum alloy by brushing so that an amount of application of the fluoride-based flux was 10 g/m$^2$ to be produced as a horizontal material. Next, an aluminum alloy (JIS-A3003, 55 mm× 25 mm× 1.0 mm) as a vertical material was installed to the horizontal material in an inverted T-shape and fixed with a stainless steel wire to produce a test piece for brazing evaluation.

Thereafter, the above-described test piece was heated at 600° C. and brazed using a brazing furnace (box-type electric oven, manufactured by NORITAKE TCF, Co., Limited, A (V)-DC-M) under a nitrogen gas atmosphere (oxygen concentration of 100 ppm or less).

Then, the superiority and the inferiority of the performance were evaluated in the following test. The results are shown in Tables 1 to 8.

A fillet after the brazing test was visually evaluated based on the following criteria:

Excellent: A fillet was formed uninterruptedly throughout the area where the horizontal material and the vertical material were in contact.

Bad: Although a fillet was formed in a part of the area where the horizontal material and the vertical material are in contact, the dispersibility of the fluoride-based flux was poor and the application was not uniformly carried out, so that discontinuation was confirmed in the fillet.

TABLE 1

| Composition | | | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|
| Brazing Filler Metal | Al-12% Si | | — | — | — | — | — | — | — | — | — |
| | Si | | — | — | — | — | — | — | — | — | — |
| Fluoride-Based Flux | K-Al-F Flux | | 33.3% | — | — | 33.3% | 33.3% | 33.3% | 33.3% | 33.3% | 33.3% |
| Solidifying Agent | Paraffin Wax | | 64.7% | 70.0% | 73.0% | 66.6% | 66.5% | 16.7% | 11.7% | 44.7% | 64.7% |
| | Stearyl Alcohol (High Melting Point Organic Compound) | | — | — | — | — | — | — | — | — | — |
| Nonionic Surfactant | Polyoxyethylene (23) Lauryl Ether (Carbon Atoms of Hydrophobic Group of 12, HLB of 16.9) | | 2.0% | 28.0% | 25.0% | 0.1% | 0.2% | 50.0% | 55.0% | 2.0% | — |
| | Polyoxyethylene (41) Lauryl Ether (Carbon Atoms of Hydrophobic Group of 12, HLB of 18.3) | | — | 2.0% | 2.0% | — | — | — | — | — | — |
| | Polyoxyethylene (4) Octyl Ether (Carbon Atoms of Hydrophobic Group of 8, HLB of 11.5) | | — | — | — | — | — | — | — | — | — |
| | Polyoxyethylene (20) Octyldodecyl Ether (Carbon Atoms of Hydrophobic Group of 12, HLB of 15) | | — | — | — | — | — | — | — | — | 2.0% |
| | Polyoxyethylene (25) Octyldodecyl Ether (Carbon Atoms of Hydrophobic Group of 12) | | — | — | — | — | — | — | — | — | — |
| | Polyoxyethylene (6) Stearyl Ether (Carbon Atoms of Hydrophobic Group of 18, HLB of 9.4) | | — | — | — | — | — | — | — | — | — |
| | Polyoxyethylene (12) Stearyl Ether (Carbon Atoms of Hydrophobic Group of 18, HLB of 13.9) | | — | — | — | — | — | — | — | — | — |
| | Polyoxyethylene Oleyl Ether (Carbon Atoms of Hydrophobic Group of 18, HLB of 13.9) | | — | — | — | — | — | — | — | — | — |
| Anionic Surfactant | Sodium Behenate (Carbon Atoms of Hydrophobic Group of 22) | | — | — | — | — | — | — | — | — | — |
| | Sodium Stearate (Carbon Atoms of Hydrophobic Group of 18) | | — | — | — | — | — | — | — | — | — |
| | Sodium Laurate (Carbon Atoms of Hydrophobic Group of 12) | | — | — | — | — | — | — | — | — | — |
| | Sodium Lauryl Sulfate (Carbon Atoms of Hydrophobic Group of 12) | | — | — | — | — | — | — | — | — | — |
| Cationic Surfactant | Behenylamine Acetate (Carbon Atoms of Hydrophobic Group of 22) | | — | — | — | — | — | — | — | — | — |
| | Stearylamine Acetate (Carbon Atoms of Hydrophobic Group of 18) | | — | — | — | — | — | — | — | — | — |
| | Laurylamine Acetate (Carbon Atoms of Hydrophobic Group of 12) | | — | — | — | — | — | — | — | — | — |
| Amphoteric Surfactant | Stearyl Dimethylaminoacetate Betaine (Carbon Atoms of Hydrophobic Group of 18) | | — | — | — | — | — | — | — | — | — |
| | Lauryl Dimethylaminoacetate Betaine (Carbon Atoms of Hydrophobic Group of 12) | | — | — | — | — | — | — | — | — | — |
| Water | Water (Molecular Weight of 18) | | — | — | — | — | — | — | — | — | — |
| Low Melting Point Organic Compound | Ethyl Hexanoic Acid Triglyceride (Molecular Weight of 471) | | — | — | — | — | — | — | — | — | — |
| | Octyldodecanol (Molecular Weight of 299) | | — | — | — | — | — | — | — | 20.0% | — |
| | Polybutylene Glycol (Molecular Weight of 4800) | | — | — | — | — | — | — | — | — | — |
| | Polybutylene Glycol (Molecular Weight of 2000) | | — | — | — | — | — | — | — | — | — |
| | Total Sum | | 100.0% | 100.0% | 100.0% | 100.0% | 100.0% | 100.0% | 100.0% | 100.0% | 100.0% |
| Evaluation | Viscosity at Melting at 150° C. (Pa·s) | | 4 | 95 | 108 | 14 | 12 | 10 | 14 | 1 | 11 |
| | Liquid Application Properties | | B | D | E | E | D | C | D | A | D |
| | Solid Application Properties | | S | A | A | S | S | C | D | C | S |
| | Coating Film Solidification Properties | | A | A | A | A | A | A | A | A | A |
| Brazing Properties | Appearance | | A | A | A | A | A | B | B | A | A |
| | Shortage of Brazing | | Excellent | Excellent | Excellent | Excellent | Excellent | Excellent | Excellent | Excellent | Excellent |

TABLE 2

| Composition | | | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|---|---|
| Brazing Filler Metal | Al-12% Si | | — | — | — | — | — | — | — | — | — |
| | Si | | — | — | — | — | — | — | — | — | — |
| Fluoride-Based Flux | K-Al-F Flux | | 33.3% | 33.3% | 33.3% | 33.3% | 33.3% | 33.3% | 33.3% | 33.3% | 33.3% |
| Solidifying Agent | Paraffin Wax | | 64.7% | 64.7% | 64.7% | 64.7% | 64.7% | 64.7% | 64.7% | 64.7% | 60.0% |
| | Stearyl Alcohol (High Melting Point Organic Compound) | | — | — | — | — | — | — | — | — | — |
| Nonionic Surfactant | Polyoxyethylene (23) Lauryl Ether (Carbon Atoms of Hydrophobic Group of 12, HLB of 16.9) | | 2.0% | — | — | — | — | — | — | — | — |
| | Polyoxyethylene (41) Lauryl Ether (Carbon Atoms of Hydrophobic Group of 12, HLB of 18.3) | | — | — | — | — | — | — | — | — | — |
| | Polyoxyethylene (4) Octyl Ether (Carbon Atoms of Hydrophobic Group of 8, HLB of 11.5) | | — | — | — | — | — | — | — | — | — |
| | Polyoxyethylene (20) Octyldodecyl Ether (Carbon Atoms of Hydrophobic Group of 12, HLB of 15) | | — | — | — | — | — | — | — | — | — |
| | Polyoxyethylene (25) Octyldodecyl Ether (Carbon Atoms of Hydrophobic Group of 12) | | — | — | — | — | — | — | — | — | — |
| | Polyoxyethylene (6) Stearyl Ether (Carbon Atoms of Hydrophobic Group of 18, HLB of 9.4) | | — | — | — | — | — | — | — | — | — |
| | Polyoxyethylene (12) Stearyl Ether (Carbon Atoms of Hydrophobic Group of 18, HLB of 13.9) | | — | — | — | — | — | — | — | — | — |
| | Polyoxyethylene Oleyl Ether (Carbon Atoms of Hydrophobic Group of 18, HLB of 13.9) | | — | — | — | — | — | — | — | — | — |
| Anionic Surfactant | Sodium Behenate (Carbon Atoms of Hydrophobic Group of 22) | | — | 2.0% | — | — | — | — | — | — | — |
| | Sodium Stearate (Carbon Atoms of Hydrophobic Group of 18) | | — | — | 2.0% | — | — | — | — | — | — |
| | Sodium Laurate (Carbon Atoms of Hydrophobic Group of 12) | | — | — | — | 2.0% | — | — | — | — | — |
| | Sodium Lauryl Sulfate (Carbon Atoms of Hydrophobic Group of 12) | | — | — | — | — | 2.0% | — | — | — | — |
| Cationic Surfactant | Behenylamine Acetate (Carbon Atoms of Hydrophobic Group of 22) | | — | — | — | — | — | 2.0% | — | — | — |
| | Stearylamine Acetate (Carbon Atoms of Hydrophobic Group of 18) | | — | — | — | — | — | — | 2.0% | — | — |
| | Laurylamine Acetate (Carbon Atoms of Hydrophobic Group of 12) | | — | — | — | — | — | — | — | 2.0% | — |
| Amphoteric Surfactant | Stearyl Dimethylaminoacetate Betaine (Carbon Atoms of Hydrophobic Group of 18) | | — | — | — | — | — | — | — | — | 2.0% |
| | Lauryl Dimethylaminoacetate Betaine (Carbon Atoms of Hydrophobic Group of 12) | | — | — | — | — | — | — | — | — | — |
| Water | Water (Molecular Weight of 18) | | — | — | — | — | — | — | — | — | 4.7% |
| Low Melting Point Organic Compound | Ethyl Hexanoic Acid Triglyceride (Molecular Weight of 471) | | — | — | — | — | — | — | — | — | — |
| | Octyldodecanol (Molecular Weight of 299) | | — | — | — | — | — | — | — | — | — |
| | Polybutylene Glycol (Molecular Weight of 4800) | | — | — | — | — | — | — | — | — | — |
| | Polybutylene Glycol (Molecular Weight of 2000) | | — | — | — | — | — | — | — | — | — |
| | Total Sum | | 100.0% | 100.0% | 100.0% | 100.0% | 100.0% | 100.0% | 100.0% | 100.0% | 100.0% |
| Evaluation | Viscosity at Melting at 150° C. (Pa · s) | | 6 | 12 | 9 | 6 | 4 | 10 | 4 | 0.2 | 11 |
| | Liquid Application Properties | | C | D | C | C | B | D | B | A | D |
| | Solid Application Properties | | S | S | S | S | S | S | S | S | A |
| | Coating Film Solidification Properties | | A | A | A | A | A | A | A | A | A |
| | Appearance | | A | A | A | A | A | A | A | A | A |
| Brazing Properties | Shortage of Brazing | | Excellent | Excellent | Excellent | Excellent | Excellent | Excellent | Excellent | Excellent | Excellent |

TABLE 3

| Composition | | Ex. 19 | Ex. 20 | Ex. 21 | Ex. 22 | Ex. 23 | Ex. 24 | Ex. 25 |
|---|---|---|---|---|---|---|---|---|
| Brazing Filler Metal | Al-12% Si | — | — | — | — | — | — | — |
| | Si | — | — | — | — | — | — | — |
| Fluoride-Based Flux | K-Al-F Flux | 33.3% | 33.3% | 33.3% | 33.3% | 33.3% | 33.3% | 33.3% |
| Solidifying Agent | Paraffin Wax | 60.0% | 64.7% | 64.7% | 63.5% | 11.7% | 11.7% | 8.7% |
| | Stearyl Alcohol (High Melting Point Organic Compound) | — | — | — | — | — | — | — |
| Nonionic Surfactant | Polyoxyethylene (23) Lauryl Ether (Carbon Atoms of Hydrophobic Group of 12, HLB of 16.9) | — | 1.5% | 1.5% | 1.5% | — | — | — |
| | Polyoxyethylene (41) Lauryl Ether (Carbon Atoms of Hydrophobic Group of 12, HLB of 18.3) | — | — | — | — | — | — | — |
| | Polyoxyethylene (4) Octyl Ether (Carbon Atoms of Hydrophobic Group of 8, HLB of 11.5) | — | — | — | — | — | — | — |
| | Polyoxyethylene (20) Octyldodecyl Ether (Carbon Atoms of Hydrophobic Group of 12, HLB of 15) | — | — | — | — | — | — | — |
| | Polyoxyethylene (25) Octyldodecyl Ether (Carbon Atoms of Hydrophobic Group of 12) | — | — | — | — | — | — | — |
| | Polyoxyethylene (6) Stearyl Ether (Carbon Atoms of Hydrophobic Group of 18, HLB of 9.4) | — | — | — | — | — | — | — |
| | Polyoxyethylene (12) Stearyl Ether (Carbon Atoms of Hydrophobic Group of 18, HLB of 13.9) | — | — | — | — | — | — | — |
| | Polyoxyethylene Oleyl Ether (Carbon Atoms of Hydrophobic Group of 18, HLB of 13.9) | — | — | — | — | — | — | — |
| Anionic Surfactant | Sodium Behenate (Carbon Atoms of Hydrophobic Group of 22) | — | — | — | — | — | — | — |
| | Sodium Stearate (Carbon Atoms of Hydrophobic Group of 18) | — | — | — | — | — | — | — |
| | Sodium Laurate (Carbon Atoms of Hydrophobic Group of 12) | — | — | — | — | — | — | — |
| | Sodium Lauryl Sulfate (Carbon Atoms of Hydrophobic Group of 12) | — | 0.5% | — | — | — | — | — |
| Cationic Surfactant | Behenylamine Acetate (Carbon Atoms of Hydrophobic Group of 22) | — | — | — | — | — | — | — |
| | Stearylamine Acetate (Carbon Atoms of Hydrophobic Group of 18) | — | — | — | — | — | — | — |
| | Laurylamine Acetate (Carbon Atoms of Hydrophobic Group of 12) | — | — | 0.5% | — | — | — | — |
| Amphoteric Surfactant | Stearyl Dimethylaminoacetate Betaine (Carbon Atoms of Hydrophobic Group of 18) | — | — | — | — | — | — | — |
| | Lauryl Dimethylaminoacetate Betaine (Carbon Atoms of Hydrophobic Group of 12) | 2.0% | — | — | 0.5% | — | — | — |
| Water | Water (Molecular Weight of 18) | 4.7% | — | — | 1.2% | — | — | — |
| Low Melting Point Organic Compound | Ethyl Hexanoic Acid Triglyceride (Molecular Weight of 471) | — | — | — | — | — | — | — |
| | Octyldodecanol (Molecular Weight of 299) | — | — | — | — | — | — | — |
| | Polybutylene Glycol (Molecular Weight of 4800) | — | — | — | — | 55.0% | 55.0% | 58.0% |
| | Polybutylene Glycol (Molecular Weight of 2000) | — | — | — | — | — | — | — |
| | Total Sum | 100.0% | 100.0% | 100.0% | 100.0% | 100.0% | 100.0% | 100.0% |
| Evaluation | Viscosity at Melting at 150° C. (Pa·s) | 7 | 0.5 | 0.1 | 1 | 5 | 3 | 4 |
| | Liquid Application Properties | C | A | S | A | B | B | B |
| | Solid Application Properties | S | S | S | S | C | C | D |
| | Coating Film Solidification Properties | A | A | A | A | B | B | C |
| | Appearance | A | A | A | A | B | B | B |
| Brazing Properties | Shortage of Brazing | Excellent | Excellent | Excellent | Excellent | Excellent | Excellent | Excellent |

TABLE 4

| | | Ex. 26 | Ex. 27 | Ex. 28 | Ex. 29 | Ex. 30 | Ex. 31 | Comp. Ex. 1 | Comp. Ex. 2 |
|---|---|---|---|---|---|---|---|---|---|
| Composition | Brazing Filler Metal Al-12% Si | — | — | — | — | — | — | — | — |
| | Si | — | — | — | — | 23.3% | 11.1% | — | — |
| | Fluoride-Based Flux K-Al-F Flux | 33.3% | 33.3% | 33.3% | 33.3% | 10.0% | 22.2% | 33.3% | 33.3% |
| | Solidifying Agent Paraffin Wax | 38.7% | 41.7% | 56.7% | 56.7% | 64.7% | 64.7% | 66.7% | 33.4% |
| | Stearyl Alcohol (High Melting Point Organic Compound) | — | — | — | — | — | — | — | — |
| | Nonionic Surfactant Polyoxyethylene (23) Lauryl Ether (Carbon Atoms of Hydrophobic Group of 12, HLB of 16.9) | — | — | — | — | — | — | — | — |
| | Polyoxyethylene (41) Lauryl Ether (Carbon Atoms of Hydrophobic Group of 12, HLB of 18.3) | — | — | — | — | — | — | — | — |
| | Polyoxyethylene (4) Octyl Ether (Carbon Atoms of Hydrophobic Group of 8, HLB of 11.5) | — | — | — | — | — | — | — | — |
| | Polyoxyethylene (20) Octyldodecyl Ether (Carbon Atoms of Hydrophobic Group of 12, HLB of 15) | — | — | — | — | — | — | — | — |
| | Polyoxyethylene (25) Octyldodecyl Ether (Carbon Atoms of Hydrophobic Group of 12) | — | — | — | 2.0% | 2.0% | 2.0% | — | — |
| | Polyoxyethylene (6) Stearyl Ether (Carbon Atoms of Hydrophobic Group of 18, HLB of 9.4) | — | — | — | — | — | — | — | — |
| | Polyoxyethylene (12) Stearyl Ether (Carbon Atoms of Hydrophobic Group of 18, HLB of 13.9) | — | — | — | — | — | — | — | — |
| | Polyoxyethylene Oleyl Ether (Carbon Atoms of Hydrophobic Group of 18, HLB of 13.9) | — | — | — | — | — | — | — | — |
| | Anionic Surfactant Sodium Behenate (Carbon Atoms of Hydrophobic Group of 22) | — | — | — | — | — | — | — | — |
| | Sodium Stearate (Carbon Atoms of Hydrophobic Group of 18) | — | — | — | — | — | — | — | — |
| | Sodium Laurate (Carbon Atoms of Hydrophobic Group of 12) | — | — | — | — | — | — | — | — |
| | Sodium Lauryl Sulfate (Carbon Atoms of Hydrophobic Group of 12) | — | — | — | — | — | — | — | — |
| | Cationic Surfactant Behenylamine Acetate (Carbon Atoms of Hydrophobic Group of 22) | — | — | — | — | — | — | — | — |
| | Stearylamine Acetate (Carbon Atoms of Hydrophobic Group of 18) | — | — | — | — | — | — | — | — |
| | Laurylamine Acetate (Carbon Atoms of Hydrophobic Group of 12) | — | — | — | — | — | — | — | — |
| | Amphoteric Surfactant Stearyl Dimethylaminoacetate Betaine (Carbon Atoms of Hydrophobic Group of 18) | — | — | — | — | — | — | — | — |
| | Lauryl Dimethylaminoacetate Betaine (Carbon Atoms of Hydrophobic Group of 12) | — | — | — | — | — | — | — | 33.3% |
| | Water (Molecular Weight of 18) | — | — | 10.0% | 10.0% | — | — | — | — |
| | Low Melting Point Organic Compound Ethyl Hexanoic Acid Triglyceride (Molecular Weight of 471) | 28.0% | 25.0% | — | — | — | — | — | — |
| | Octyldodecanol (Molecular Weight of 299) | — | — | — | — | — | — | — | — |
| | Polybutylene Glycol (Molecular Weight of 4800) | — | — | — | — | — | — | — | — |
| | Polybutylene Glycol (Molecular Weight of 2000) | — | — | — | — | — | — | — | — |
| | Total Sum | 100.0% | 100.0% | 100.0% | 100.0% | 100.0% | 100.0% | 100.0% | 100.0% |
| Evaluation | Viscosity at Melting at 150° C. (Pa·s) | 0.8 | 0.7 | 14 | 11 | 3 | 4 | 15 | 95 |
| | Liquid Application Properties | A | A | E | D | B | B | Bad | Bad |
| | Solid Application Properties | C | C | B | B | B | B | * | Bad |
| | Coating Film Solidification Properties | B | A | A | A | A | A | Discharge Impossible | |
| Brazing Properties | Appearance | B Excellent | B Excellent | B Excellent | B Excellent | A Excellent | A Excellent | A | A |
| | Shortage of Brazing | | | | | | | Bad | Bad |

TABLE 5

| | | No. | | | | | | | | |
|---|---|---|---|---|---|---|---|---|---|---|
| | | Ex. 32 | Ex. 33 | Ex. 34 | Ex. 35 | Ex. 36 | Ex. 37 | Ex. 38 | Ex. 39 | Ex. 40 |
| Composition | Brazing Filler Metal Al-12% Si | — | — | — | — | — | — | — | — | — |
| | Si | — | — | — | — | — | — | — | — | — |
| | Fluoride-Based Flux K-Al-F Flux | 33.3% | 12.0% | 7.0% | 70.0% | 75.0% | 33.3% | 33.3% | 33.3% | 33.3% |
| | Solidifying Agent Paraffin Wax | 9.0% | 86.0% | 91.0% | — | — | — | — | — | — |
| | Nonionic Surfactant Stearyl Alcohol (High Melting Point Organic Compound) | — | — | — | — | — | — | — | — | — |
| | Polyoxyethylene (23) Lauryl Ether (Carbon Atoms of Hydrophobic Group of 12, HLB of 16.9) | 57.7% | 2.0% | 2.0% | 9.0% | 23.0% | 10.0% | 12.0% | 28.0% | 64.7% |
| | Polyoxyethylene (41) Lauryl Ether (Carbon Atoms of Hydrophobic Group of 12, HLB of 18.3) | — | — | — | 21.0% | 2.0% | 56.7% | 54.7% | 38.7% | 2.0% |
| | Polyoxyethylene (4) Octyl Ether (Carbon Atoms of Hydrophobic Group of 8, HLB of 11.5) | — | — | — | — | — | — | — | — | — |
| | Polyoxyethylene (20) Octyldodecyl Ether (Carbon Atoms of Hydrophobic Group of 12, HLB of 15) | — | — | — | — | — | — | — | — | — |
| | Polyoxyethylene (25) Octyldodecyl Ether (Carbon Atoms of Hydrophobic Group of 12) | — | — | — | — | — | — | — | — | — |
| | Polyoxyethylene (6) Stearyl Ether (Carbon Atoms of Hydrophobic Group of 18, HLB of 9.4) | — | — | — | — | — | — | — | — | — |
| | Polyoxyethylene (12) Stearyl Ether (Carbon Atoms of Hydrophobic Group of 18, HLB of 13.9) | — | — | — | — | — | — | — | — | — |
| | Polyoxyethylene Oleyl Ether (Carbon Atoms of Hydrophobic Group of 18, HLB of 13.9) | — | — | — | — | — | — | — | — | — |
| Anionic Surfactant | Sodium Behenate (Carbon Atoms of Hydrophobic Group of 22) | — | — | — | — | — | — | — | — | — |
| | Sodium Stearate (Carbon Atoms of Hydrophobic Group of 18) | — | — | — | — | — | — | — | — | — |
| | Sodium Laurate (Carbon Atoms of Hydrophobic Group of 12) | — | — | — | — | — | — | — | — | — |
| | Sodium Lauryl Sulfate (Carbon Atoms of Hydrophobic Group of 12) | — | — | — | — | — | — | — | — | — |
| Cationic Surfactant | Behenylamine Acetate (Carbon Atoms of Hydrophobic Group of 22) | — | — | — | — | — | — | — | — | — |
| | Stearylamine Acetate (Carbon Atoms of Hydrophobic Group of 18) | — | — | — | — | — | — | — | — | — |
| | Laurylamine Acetate (Carbon Atoms of Hydrophobic Group of 12) | — | — | — | — | — | — | — | — | — |
| Amphoteric Surfactant | Stearyl Dimethylaminoacetate Betaine (Carbon Atoms of Hydrophobic Group of 18) | — | — | — | — | — | — | — | — | — |
| | Lauryl Dimethylaminoacetate Betaine (Carbon Atoms of Hydrophobic Group of 12) | — | — | — | — | — | — | — | — | — |
| Water | Water (Molecular Weight of 18) | — | — | — | — | — | — | — | — | — |
| Low Melting Point Organic Compound | Ethyl Hexanoic Acid Triglyceride (Molecular Weight of 471) | — | — | — | — | — | — | — | — | — |
| | Octyldodecanol (Molecular Weight of 299) | — | — | — | — | — | — | — | — | — |
| | Polybutylene Glycol (Molecular Weight of 4800) | — | — | — | — | — | — | — | — | — |
| | Polybutylene Glycol (Molecular Weight of 2000) | — | — | — | — | — | — | — | — | — |
| | Total Sum | 100.0% | 100.0% | 100.0% | 100.0% | 100.0% | 100.0% | 100.0% | 100.0% | 100.0% |
| Evaluation | Viscosity at Melting at 150° C. (Pa · s) | 16 | 0.01 | 0.01 | 81 | 102 | 15 | 14 | 3 | 1 |
| | Liquid Application Properties | E | S | S | D | E | E | D | B | S |
| | Solid Application Properties | D | A | B | A | A | E | D | B | A |
| | Coating Film Solidification Properties | A | A | A | S | S | C | C | A | A |
| Brazing Properties | Appearance | C | B | C | A | A | A | A | A | A |
| | Shortage of Brazing | Excellent | Excellent | Excellent | Excellent | Excellent | Excellent | Excellent | Excellent | Excellent |

TABLE 6

| | | No. | | | | | | | |
|---|---|---|---|---|---|---|---|---|---|
| | | Ex. 41 | Ex. 42 | Ex. 43 | Ex. 44 | Ex. 45 | Ex. 46 | Ex. 47 | Ex. 48 |
| Composition | Brazing Filler Metal Al-12% Si | — | — | — | — | — | — | — | — |
| | Si | — | — | — | — | — | — | — | — |
| | Fluoride-Based Flux K-Al-F Flux | 12.0% | 7.0% | 33.3% | 33.3% | 33.3% | 33.3% | 33.3% | 70.0% |
| | Solidifying Agent Paraffin Wax | — | — | — | — | — | — | — | — |
| | Stearyl Alcohol (High Melting Point Organic Compound) | 86.0% | 91.0% | 64.7% | 64.7% | 64.7% | 63.5% | 16.7% | 28.0% |
| | Nonionic Surfactant Polyoxyethylene (23) Lauryl Ether (Carbon Atoms of Hydrophobic Group of 12, HLB of 16.9) | 2.0% | 2.0% | — | — | — | 1.5% | 50.0% | — |
| | Polyoxyethylene (41) Lauryl Ether (Carbon Atoms of Hydrophobic Group of 12, HLB of 18.3) | — | — | — | — | — | — | — | — |
| | Polyoxyethylene (4) Octyl Ether (Carbon Atoms of Hydrophobic Group of 8, HLB of 11.5) | — | — | — | — | — | — | — | — |
| | Polyoxyethylene (20) Octyldodecyl Ether (Carbon Atoms of Hydrophobic Group of 12, HLB of 15) | — | — | — | — | — | — | — | — |
| | Polyoxyethylene (25) Octyldodecyl Ether (Carbon Atoms of Hydrophobic Group of 12) | — | — | — | — | — | — | — | — |
| | Polyoxyethylene (6) Stearyl Ether (Carbon Atoms of Hydrophobic Group of 18, HLB of 9.4) | — | — | — | — | — | — | — | — |
| | Polyoxyethylene (12) Stearyl Ether (Carbon Atoms of Hydrophobic Group of 18, HLB of 13.9) | — | — | — | — | — | — | — | — |
| | Polyoxyethylene Oleyl Ether (Carbon Atoms of Hydrophobic Group of 18, HLB of 13.9) | — | — | — | — | — | — | — | — |
| | Anionic Surfactant Sodium Behenate (Carbon Atoms of Hydrophobic Group of 22) | — | — | — | — | — | — | — | — |
| | Sodium Stearate (Carbon Atoms of Hydrophobic Group of 18) | — | — | — | — | — | — | — | — |
| | Sodium Laurate (Carbon Atoms of Hydrophobic Group of 12) | — | — | — | — | — | — | — | — |
| | Sodium Lauryl Sulfate (Carbon Atoms of Hydrophobic Group of 12) | — | — | 2.0% | — | — | — | — | — |
| | Cationic Surfactant Behenylamine Acetate (Carbon Atoms of Hydrophobic Group of 22) | — | — | — | — | — | — | — | — |
| | Stearylamine Acetate (Carbon Atoms of Hydrophobic Group of 18) | — | — | — | — | — | — | — | — |
| | Laurylamine Acetate (Carbon Atoms of Hydrophobic Group of 12) | — | — | — | 2.0% | 0.5% | — | — | 2.0% |
| | Amphoteri Surfactant Stearyl Dimethylaminoacetate Betaine (Carbon Atoms of Hydrophobic Group of 18) | — | — | — | — | — | 0.5% | — | — |
| | Lauryl Dimethylaminoacetate Betaine (Carbon Atoms of Hydrophobic Group of 12) | — | — | — | — | — | 1.2% | — | — |
| | Water (Molecular Weight of 18) | — | — | — | — | — | — | — | — |
| | Low Melting Point Organic Compound Ethyl Hexanoic Acid Triglyceride (Molecular Weight of 471) | — | — | — | — | — | — | — | — |
| | Octyldodecanol (Molecular Weight of 299) | — | — | — | — | — | — | — | — |
| | Polybutylene Glycol (Molecular Weight of 4800) | — | — | — | — | — | — | — | — |
| | Polybutylene Glycol (Molecular Weight of 2000) | — | — | — | — | — | — | — | — |
| | Total Sum | 100.0% | 100.0% | 100.0% | 100.0% | 100.0% | 100.0% | 100.0% | 100.0% |
| Evaluation | Viscosity at Melting at 150° C. (Pa·s) | 0.6 | 0.5 | 8 | 0.5 | 0.1 | 0.3 | 7 | 80 |
| | Liquid Application Properties | A | A | C | A | S | A | C | E |
| | Solid Application Properties | A | B | S | S | S | A | B | A |
| | Coating Film Solidification Properties | A | A | A | A | A | A | A | A |
| | Brazing Properties Appearance | B | C | Excellent | Excellent | Excellent | Excellent | B | A |
| | Shortage of Brazing | Excellent | Excellent | Excellent | Excellent | Excellent | Excellent | Excellent | Excellent |

TABLE 7

| | | No. | | | | | | | | | |
|---|---|---|---|---|---|---|---|---|---|---|---|
| | | Ex. 49 | Ex. 50 | Ex. 51 | Ex. 52 | Ex. 53 | Ex. 54 | Ex. 55 | Ex. 56 | Ex. 57 | Ex. 58 |
| Composition | Brazing Filler Metal Al-12% Si | — | — | — | — | — | — | — | — | — | — |
| | Si | — | — | — | — | — | — | — | — | — | — |
| | Fluoride-Based Flux K-Al-F Flux | 70.0% | 30.0% | 30.0% | 30.0% | 50.0% | 50.0% | 50.0% | 30.0% | 30.0% | 30.0% |
| | Solidifying Agent Paraffin Wax | 28.0% | 60.0% | 40.0% | 20.0% | 45.0% | 45.0% | 45.0% | 60.0% | 40.0% | 20.0% |
| | Stearyl Alcohol (High Melting Point Organic Compound) | — | — | — | — | — | — | — | — | — | — |
| | Nonionic Surfactant Polyoxyethylene (23) Lauryl Ether (Carbon Atoms of Hydrophobic Group of 12, HLB of 16.9) | — | — | — | — | 5.0% | — | — | — | — | — |
| | Polyoxyethylene (41) Lauryl Ether (Carbon Atoms of Hydrophobic Group of 12, HLB of 18.3) | — | — | — | — | — | — | — | — | — | — |
| | Polyoxyethylene (4) Octyl Ether (Carbon Atoms of Hydrophobic Group of 8, HLB of 11.5) | — | — | — | — | — | — | — | — | — | — |
| | Polyoxyethylene (20) Octyldodecyl Ether (Carbon Atoms of Hydrophobic Group of 12, HLB of 15) | — | — | — | — | — | — | — | — | — | — |
| | Polyoxyethylene (25) Octyldodecyl Ether (Carbon Atoms of Hydrophobic Group of 12) | — | — | — | — | — | — | — | — | — | — |
| | Polyoxyethylene (6) Stearyl Ether (Carbon Atoms of Hydrophobic Group of 18, HLB of 9.4) | — | — | — | — | — | — | — | — | — | — |
| | Polyoxyethylene (12) Stearyl Ether (Carbon Atoms of Hydrophobic Group of 18, HLB of 13.9) | — | — | — | — | — | — | — | — | — | — |
| | Polyoxyethylene Oleyl Ether (Carbon Atoms of Hydrophobic Group of 18, HLB of 13.9) | — | — | — | — | — | — | — | — | — | — |
| | Anionic Surfactant Sodium Behenate (Carbon Atoms of Hydrophobic Group of 22) | — | — | — | — | — | — | — | — | — | — |
| | Sodium Stearate (Carbon Atoms of Hydrophobic Group of 18) | — | — | — | — | — | — | — | — | — | — |
| | Sodium Laurate (Carbon Atoms of Hydrophobic Group of 12) | — | — | — | — | — | — | 5.0% | — | — | — |
| | Sodium Lauryl Sulfate (Carbon Atoms of Hydrophobic Group of 12) | — | — | — | 50.0% | — | — | — | — | — | — |
| | Cationic Surfactant Behenylamine Acetate (Carbon Atoms of Hydrophobic Group of 22) | — | — | 30.0% | — | — | — | — | — | — | — |
| | Stearylamine Acetate (Carbon Atoms of Hydrophobic Group of 18) | — | 10.0% | — | — | — | — | — | — | — | — |
| | Laurylamine Acetate (Carbon Atoms of Hydrophobic Group of 12) | 2.0% | — | — | — | — | — | — | — | — | — |
| | Amphoteric Surfactant Stearyl Dimethylaminoacetate Betaine (Carbon Atoms of Hydrophobic Group of 18) | — | — | — | — | — | 5.0% | — | — | — | — |
| | Lauryl Dimethylaminoacetate Betaine (Carbon Atoms of Hydrophobic Group of 12) | — | — | — | — | — | — | — | — | — | — |
| | Water (Molecular Weight of 18) | — | — | — | — | — | — | — | — | — | — |
| | Low Melting Point Organic Compound Ethyl Hexanoic Acid Triglyceride (Molecular Weight of 471) | — | — | — | — | — | — | — | — | — | 50.0% |
| | Octyldodecanol (Molecular Weight of 299) | — | — | — | — | — | — | — | — | — | — |
| | Polybutylene Glycol (Molecular Weight of 4800) | — | — | — | — | — | — | — | 10.0% | — | — |
| | Polybutylene Glycol (Molecular Weight of 2000) | — | — | — | — | — | — | — | — | 30.0% | — |
| | Total Sum | 100.0% | 100.0% | 100.0% | 100.0% | 100.0% | 100.0% | 100.0% | 100.0% | 100.0% | 100.0% |
| Evaluation | Viscosity at Melting at 150° C. (Pa · s) | 11 | 0.7 | 0.5 | 0.1 | 7 | 0.8 | 4 | 1.7 | 1.5 | 0.8 |
| | Liquid Application Properties | C | A | A | S | C | A | B | B | B | A |
| | Solid Application Properties | S | A | B | C | S | A | S | A | B | C |
| | Coating Film Solidification Properties | A | A | A | A | A | A | A | A | A | A |
| | Brazing Properties Appearance | A | A | B | B | A | A | A | A | B | A |
| | Shortage of Brazing | Excellent | Excellent | Excellent | Excellent | Excellent | Excellent | Excellent | Excellent | Excellent | Excellent |

TABLE 8

| | | Ex. 59 | Ex. 60 | Ex. 61 | Ex. 62 | Ex. 63 | Ex. 64 | Ex. 65 | Ex. 66 | Ex. 67 | Ex. 68 | Ex. 69 |
|---|---|---|---|---|---|---|---|---|---|---|---|---|
| Composition | Brazing Filler Metal Al-12% Si | — | — | — | — | — | — | — | — | — | — | — |
| | Si | — | — | — | — | — | — | — | — | — | — | — |
| | Fluoride-Based Flux K-Al-F Flux | 50.0% | 50.0% | 50.0% | 50.0% | 50.0% | 30.0% | 30.0% | 30.0% | 33.3% | 33.3% | 33.3% |
| | Solidifying Agent Paraffin Wax | 45.0% | 45.0% | 45.0% | 45.0% | 45.0% | 60.0% | 40.0% | 20.0% | 15.6% | 15.6% | 16.7% |
| | Stearyl Alcohol (High Melting Point Organic Compound) | — | — | — | — | — | — | — | — | 51.1% | 51.1% | 50.0% |
| | Nonionic Surfactant Polyoxyethylene (23) Lauryl Ether (Carbon Atoms of Hydrophobic Group of 12, HLB of 16.9) | — | — | — | — | — | — | — | — | — | — | — |
| | Polyoxyethylene (41) Lauryl Ether (Carbon Atoms of Hydrophobic Group of 12, HLB of 18.3) | — | — | — | — | — | — | — | — | — | — | — |
| | Polyoxyethylene (4) Octyl Ether (Carbon Atoms of Hydrophobic Group of 8, HLB of 11.5) | — | — | — | — | — | — | — | — | — | — | — |
| | Polyoxyethylene (20) Octyldodecyl Ether (Carbon Atoms of Hydrophobic Group of 12, HLB of 15) | 5.0% | — | — | — | — | — | — | — | — | — | — |
| | Polyoxyethylene (25) Octyldodecyl Ether (Carbon Atoms of Hydrophobic Group of 12) | — | 5.0% | — | — | — | — | — | — | — | — | — |
| | Polyoxyethylene (6) Stearyl Ether (Carbon Atoms of Hydrophobic Group of 18, HLB of 9.4) | — | — | 5.0% | — | — | — | — | — | — | — | — |
| | Polyoxyethylene (12) Stearyl Ether (Carbon Atoms of Hydrophobic Group of 18, HLB of 13.9) | — | — | — | 5.0% | — | — | — | — | — | — | — |
| | Polyoxyethylene Oleyl Ether (Carbon Atoms of Hydrophobic Group of 18, HLB of 13.9) | — | — | — | — | 5.0% | — | — | — | — | — | — |
| | Anionic Surfactant Sodium Behenate (Carbon Atoms of Hydrophobic Group of 22) | — | — | — | — | — | 10.0% | 30.0% | 50.0% | — | — | — |
| | Sodium Stearate (Carbon Atoms of Hydrophobic Group of 18) | — | — | — | — | — | — | — | — | — | — | — |
| | Sodium Laurate (Carbon Atoms of Hydrophobic Group of 12) | — | — | — | — | — | — | — | — | — | — | — |
| | Sodium Lauryl Sulfate (Carbon Atoms of Hydrophobic Group of 12) | — | — | — | — | — | — | — | — | — | — | — |
| | Cationic Surfactant Behenylamine Acetate (Carbon Atoms of Hydrophobic Group of 22) | — | — | — | — | — | — | — | — | — | — | — |
| | Stearylamine Acetate (Carbon Atoms of Hydrophobic Group of 18) | — | — | — | — | — | — | — | — | — | — | — |
| | Laurylamine Acetate (Carbon Atoms of Hydrophobic Group of 12) | — | — | — | — | — | — | — | — | — | — | — |
| | Amphoteric Surfactant Stearyl Dimethylaminoacetate Betaine (Carbon Atoms of Hydrophobic Group of 18) | — | — | — | — | — | — | — | — | — | — | — |
| | Lauryl Dimethylaminoacetate Betaine (Carbon Atoms of Hydrophobic Group of 12) | — | — | — | — | — | — | — | — | — | — | — |
| | Water (Molecular Weight of 18) | — | — | — | — | — | — | — | — | — | — | — |
| | Low Melting Point Organic Compound Ethyl Hexanoic Acid Triglyceride (Molecular Weight of 471) | — | — | — | — | — | — | — | — | — | — | — |
| | Octyldodecanol (Molecular Weight of 299) | — | — | — | — | — | — | — | — | — | — | — |
| | Polybutylene Glycol (Molecular Weight of 4800) | — | — | — | — | — | — | — | — | — | — | — |
| | Polybutylene Glycol (Molecular Weight of 2000) | — | — | — | — | — | — | — | — | — | — | — |
| | Total Sum | 100.0% | 100.0% | 100.0% | 100.0% | 100.0% | 100.0% | 100.0% | 100.0% | 100.0% | 100.0% | 100.0% |
| Evaluation | Viscosity at Melting at 150° C. (Pa·s) | 14 | 14 | 10 | 14 | 13 | 13 | 10 | 3 | 11 | 11 | 10 |
| | Liquid Application Properties | D | D | C | D | D | D | C | B | D | D | C |
| | Solid Application Properties | S | S | S | S | S | A | B | C | D | D | C |
| | Coating Film Solidification Properties | A | A | A | A | A | A | A | A | A | A | A |
| Brazing Properties | Appearance | A | A | A | A | A | A | B | B | B | A | A |
| | Shortage of Brazing | Excellent | Excellent | Excellent | Excellent | Excellent | Excellent | Excellent | Excellent | Excellent | Excellent | Excellent |

The details of each component in Tables are as follows.
Brazing Filler Metal
Al—12% Si: Al brazing filler metal including 12% of Si, trade name: ECKA Aluminium-Silicon 12AN<0.025 mm, manufactured by ECKA Granules Germany GmbH
Si: Si brazing filler metal, trade name: M-Si SH-2 fine powder, product of 45 μm, manufactured by KINSEI MATEC CO., LTD.
Fluoride-Based Flux
K—Al—F Flux: trade name: NOCOLOK Flux, manufactured by Solvay Japan, Ltd.
Solidifying Agent
Paraffin Wax: trade name: Paraffin Wax-135, manufactured by NIPPON SEIRO CO., LTD.
Stearyl Alcohol: high melting point organic compound (melting point of 59° C.)
Nonionic Surfactant
Polyoxyethylene (23) Lauryl Ether: carbon atoms of hydrophobic group of 12, unit number of polyoxyethylene of 23, HLB of 16.9, trade name: EMULGEN 123P, manufactured by Kao Corporation
Polyoxyethylene (41) Lauryl Ether: carbon atoms of hydrophobic group of 12, unit number of polyoxyethylene of 41, HLB of 18.3, trade name: EMULGEN 130K, manufactured by Kao Corporation
Polyoxyethylene (4) Octyl Ether: carbon atoms of hydrophobic group of 12, unit number of polyoxyethylene of 8, HLB of 11.5, trade name: Tetraethylene Glycol Monooctyl Ether, manufactured by Merck KGaA
Polyoxyethylene (20) Octyldodecyl Ether (carbon atoms of hydrophobic group of 12, HLB of 15), trade name: EMULGEN 108, manufactured by Kao Corporation
Polyoxyethylene (25) Octyldodecyl Ether (carbon atoms of hydrophobic group of 12, HLB of 15.7), trade name: EMULGEN 2020G-HA, manufactured by Kao Corporation
Polyoxyethylene (6) Stearyl Ether (carbon atoms of hydrophobic group of 18, HLB of 9.4), trade name: EMULGEN 306P, manufactured by Kao Corporation
Polyoxyethylene (12) Stearyl Ether (carbon atoms of hydrophobic group of 18, HLB of 13.9), trade name: EMULGEN 320P, manufactured by Kao Corporation
Polyoxyethylene Oleyl Ether (carbon atoms of hydrophobic group of 18, HLB of 13.9), trade name: EMULGEN 420P, manufactured by Kao Corporation
Anionic Surfactant
Sodium Behenate: carbon atoms of hydrophobic group of 22, trade name: NS-7, manufactured by NITTO KASEI KOGYO K.K.
Sodium Stearate: carbon atoms of hydrophobic group of 18, trade name: Sodium Stearate, manufactured by Kishida Chemical Co., Ltd.
Sodium Laurate: carbon atoms of hydrophobic group of 12, trade name: Sodium Laurate, manufactured by Kishida Chemical Co., Ltd.
Sodium Lauryl Sulfate: carbon atoms of hydrophobic group of 12, trade name: EMAL 0, manufactured by Kao Corporation
Cationic Surfactant
Behenylamine Acetate: carbon atoms of hydrophobic group of 22, composition prepared by mixing trade name: Nissan Amine VB-S (manufactured by NOF CORPORATION) and trade name: Acetate (manufactured by Kishida Chemical Co., Ltd.) at 1:1 (mole ratio)
Stearylamine Acetate: carbon atoms of hydrophobic group of 18, trade name: ACETAMIN 86, manufactured by Kao Corporation
Laurylamine Acetate: carbon atoms of hydrophobic group of 12, trade name: ACETAMIN 24, manufactured by Kao Corporation
Amphoteric Surfactant
Stearyl Dimethylaminoacetate Betaine: carbon atoms of hydrophobic group of 18, trade name: AMPHITOL 86B, manufactured by Kao Corporation
Lauryl Dimethylaminoacetate Betaine: carbon atoms of hydrophobic group of 12, trade name: AMPHITOL 24B, manufactured by Kao Corporation
Low Melting Point Organic Compound
Ethyl Hexanoic Acid Triglyceride: trade name: EXCEPARL TGO, manufactured by Kao Corporation
Octyldodecanol: trade name: KALCOL 200GD, manufactured by Kao Corporation
Polybutylene Glycol A: number average molecular weight of 4800, polyoxybutylene glycol, trade name: UNIOL PB-2000, manufactured by NOF CORPORATION
Polybutylene Glycol B: number average molecular weight of 2000, polyoxybutylene glycol, trade name: UNIOL PB-4800, manufactured by NOF CORPORATION While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

INDUSTRIAL APPLICATION

The brazing material, the brazing member including a coating film formed by applying the brazing material, the heat exchanger including the brazing member, and furthermore, the method for producing a brazing member of the present invention are, for example, preferably used for heat exchangers for automobile air conditioners and heat exchangers for indoor air conditioners.

DESCRIPTION OF REFERENCE NUMBER

1 Heat exchanger
22 Al substrate
27 Brazing material
29 Coating film
31 Discharge device

The invention claimed is:
1. A brazing material for brazing aluminum or an aluminum alloy comprising:
fluoride-based flux,
a solidifying agent, and
an organic viscosity reducing agent,
the fluoride-based flux being at least one selected from the group consisting of Cs—Al—F flux and K—Al—F flux,
the solidifying agent including at least one compound selected from the group consisting of a normal temperature solid hydrocarbon, a normal temperature solid alkyl alcohol, a normal temperature solid ether alcohol, and a high carbon carboxylic acid-high carbon alcohol ester, a mixing ratio of the solidifying agent with respect to 100 parts by mass of the fluoride-based flux being 10 parts by mass or more and 2000 parts by mass or less, and the brazing material being solid at 25° C.

2. The brazing material according to claim 1 being softened by heating and having the viscosity at 150° C. of 100 Pa s or less.

3. The brazing material according to claim 1, wherein a mixing ratio of the organic viscosity reducing agent with respect to the total amount of the brazing material is 0.1% by mass or more and 55% by mass or less.

4. The brazing material according to claim 1, wherein the organic viscosity reducing agent includes a surfactant and/or an organic solvent in liquid at 10° C.

5. The brazing material according to claim 4, wherein the surfactant includes at least one selected from the group consisting of a nonionic surfactant, an anionic surfactant, a cationic surfactant, and an amphoteric surfactant.

6. The brazing material according to claim 4, wherein the surfactant includes a nonionic surfactant, and the number of carbon atoms of a hydrophobic group of the nonionic surfactant is 10 or more.

7. The brazing material according to claim 4, wherein the surfactant includes a nonionic surfactant, and an HLB value of the nonionic surfactant is 17.5 or less.

8. The brazing material according to claim 4, wherein the surfactant includes a nonionic surfactant, and the nonionic surfactant includes a polyoxyalkylene group.

9. The brazing material according to claim 4, wherein the surfactant includes an anionic surfactant, and the number of carbon atoms of a hydrophobic group of the anionic surfactant is 20 or less.

10. The brazing material according to claim 4, wherein the surfactant includes an anionic surfactant, and the anionic surfactant includes at least one selected from the group consisting of a carboxylic acid group, a carboxylic acid salt, a sulfonic acid group, and a sulfonic acid salt.

11. The brazing material according to claim 4, wherein the surfactant includes a cationic surfactant, and the number of carbon atoms of a hydrophobic group of the cationic surfactant is 20 or less.

12. The brazing material according to claim 4, wherein the surfactant includes a cationic surfactant, and the cationic surfactant includes an amino group and/or a salt thereof.

13. The brazing material according to claim 4, wherein the surfactant includes an amphoteric surfactant, and the number of carbon atoms of a hydrophobic group of the amphoteric surfactant is 20 or less.

14. The brazing material according to claim 4, wherein the surfactant includes an amphoteric surfactant, and the amphoteric surfactant includes an amino group and/or a salt thereof.

15. The brazing material according to claim 4, wherein the surfactant includes a nonionic surfactant and an anionic surfactant.

16. The brazing material according to claim 4, wherein the surfactant includes a nonionic surfactant and a cationic surfactant.

17. The brazing material according to claim 4, wherein the surfactant includes a nonionic surfactant and an amphoteric surfactant.

18. The brazing material according to claim 4, wherein a mixing ratio of the surfactant with respect to the total amount of the brazing material is 0.2% by mass or more and 50% by mass or less.

19. The brazing material according to claim 4, wherein the organic solvent includes at least one selected from the group consisting of hydrocarbons, halogenated hydrocarbons, alcohols, esters, ethers, and oils and fats.

20. The brazing material according to claim 4, wherein a mixing ratio of the organic solvent with respect to the total amount of the brazing material is 55% by mass or less.

21. The brazing material according to claim 4, wherein a mixing ratio of the organic solvent with respect to the total amount of the brazing material is 25% by mass or less.

22. The brazing material according to claim 4, wherein a molecular weight of the organic solvent is 4000 or less.

23. The brazing material according to claim 1 further comprising:
a brazing material powder, wherein
the brazing material powder is made of a metal capable of forming a eutectic alloy with aluminum and/or
an alloy of the metal and aluminum.

24. A brazing member comprising:
aluminum or an aluminum alloy, and
a coating film formed by applying the brazing material according to claim 1 to the aluminum or the aluminum alloy.

25. A heat exchanger comprising:
the brazing member according to claim 24.

26. A method for producing a brazing member comprising:
a processing step of processing a substrate made of aluminum or an aluminum alloy and an application step of heating and melting the brazing material according to claim 1 and then, supplying the brazing material to a discharge device to be discharged to the substrate.

27. A method for producing a brazing member comprising:
a processing step of processing a substrate made of aluminum or an aluminum alloy and
an application step of applying the brazing material according to claim 1 to the substrate by rubbing.

* * * * *